US012625017B2

(12) United States Patent
Huang et al.

(10) Patent No.: US 12,625,017 B2
(45) Date of Patent: May 12, 2026

(54) DUAL HEAT PATH TEMPERATURE SENSOR

(71) Applicant: Apple Inc., Cupertino, CA (US)

(72) Inventors: Wanfeng Huang, Fremont, CA (US);
Hongling Chen, San Jose, CA (US);
Ali M. Amin, Sunnyvale, CA (US);
James C. Clements, Campbell, CA (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 18/353,040

(22) Filed: Jul. 14, 2023

(65) Prior Publication Data

US 2024/0060832 A1    Feb. 22, 2024

Related U.S. Application Data

(60) Provisional application No. 63/371,820, filed on Aug. 18, 2022.

(51) Int. Cl.
G01K 17/16 (2006.01)
G01K 7/06 (2006.01)
G01K 1/143 (2021.01)

(52) U.S. Cl.
CPC .............. G01K 17/16 (2013.01); G01K 7/06 (2013.01); *G01K 1/143* (2013.01)

(58) Field of Classification Search
CPC ............ G01K 1/143; G01K 7/06; G01K 7/42; G01K 7/427; G01K 13/20; G01K 17/16
See application file for complete search history.

(56) References Cited

U.S. PATENT DOCUMENTS

| | | | |
|---|---|---|---|
| 4,138,878 A | 2/1979 | Holmes et al. | |
| 4,197,738 A | 4/1980 | Degenne | |
| 4,567,365 A | 1/1986 | Degenne | |
| 5,294,200 A | 3/1994 | Rall | |
| 6,278,051 B1 | 8/2001 | Peabody | |
| 9,664,569 B2 | 5/2017 | Mittleman et al. | |

(Continued)

FOREIGN PATENT DOCUMENTS

| | | |
|---|---|---|
| CN | 109632144 A | 4/2019 |
| CN | 111867456 A | 10/2020 |

(Continued)

OTHER PUBLICATIONS

Computer translation of WO_2016067952_A1 (Year: 2025).*

(Continued)

*Primary Examiner* — Randy W Gibson
(74) *Attorney, Agent, or Firm* — Kubota & Basol LLP

(57) ABSTRACT

A temperature sensing system includes absolute temperature sensor(s) and/or thermopiles that form concentric geometries and are uniform in height. In some examples, the temperature sensing system can determine internal body temperature and/or ambient temperature based at least on a thermal gradient associated with the inner thermopile, a thermal gradient associated with the outer thermopile, a lateral temperature difference between the inner and the outer thermopiles, and an absolute temperature. In some examples, the temperature sensing system can determine the internal body temperature and/or ambient temperature using at least four absolute temperature sensors forming a concentric structure.

20 Claims, 10 Drawing Sheets

(56) References Cited

U.S. PATENT DOCUMENTS

| | | | |
|---|---|---|---|
| 9,704,209 B2 | 7/2017 | Proud et al. | |
| 9,976,908 B2 | 5/2018 | Jarboe et al. | |
| 10,060,803 B2 | 8/2018 | Nakagawa et al. | |
| 10,098,548 B2 | 10/2018 | Abreu | |
| 10,227,063 B2 | 3/2019 | Abreu | |
| 10,670,546 B2 | 6/2020 | Rud et al. | |
| 11,313,741 B2 | 4/2022 | Lupo et al. | |
| 2005/0043631 A1 | 2/2005 | Fraden | |
| 2006/0056487 A1 | 3/2006 | Kuroda et al. | |
| 2006/0071323 A1 | 4/2006 | Martin et al. | |
| 2009/0219969 A1 | 9/2009 | Yamamoto | |
| 2011/0118608 A1 | 5/2011 | Lindner et al. | |
| 2011/0273378 A1 | 11/2011 | Alameh et al. | |
| 2012/0128024 A1* | 5/2012 | Tsuchida | G01K 13/20 |
| | | | 374/E17.001 |
| 2012/0134386 A1 | 5/2012 | Bender et al. | |
| 2013/0331728 A1* | 12/2013 | Sun | G01K 1/165 |
| | | | 600/549 |
| 2014/0278201 A1 | 9/2014 | Shimizu | |
| 2015/0104206 A1 | 4/2015 | Okada | |
| 2015/0258544 A1 | 9/2015 | Stern et al. | |
| 2015/0308906 A1 | 10/2015 | Durrer et al. | |
| 2016/0178443 A1 | 6/2016 | Emadi et al. | |
| 2016/0238463 A1 | 8/2016 | Bieberich et al. | |
| 2017/0147017 A1 | 5/2017 | Ishii et al. | |
| 2017/0258329 A1 | 9/2017 | Marsh | |
| 2017/0311812 A1 | 11/2017 | Husheer | |
| 2017/0320463 A1 | 11/2017 | Saitou et al. | |
| 2018/0313699 A1 | 11/2018 | Vaiana et al. | |
| 2019/0049317 A1 | 2/2019 | Tsuchimoto | |
| 2019/0117155 A1 | 4/2019 | Cross et al. | |
| 2019/0388031 A1 | 12/2019 | Haber et al. | |
| 2020/0085310 A1 | 3/2020 | Zahner et al. | |
| 2021/0028340 A1 | 1/2021 | Taniguchi | |
| 2021/0223817 A1 | 7/2021 | Ishii et al. | |
| 2021/0404883 A1* | 12/2021 | Rahmani | G01K 7/00 |
| 2022/0000375 A1 | 1/2022 | Meisal | |
| 2022/0026284 A1 | 1/2022 | Clements et al. | |
| 2023/0098236 A1 | 3/2023 | Tadele et al. | |
| 2023/0099531 A1 | 3/2023 | Tadele et al. | |
| 2023/0099638 A1 | 3/2023 | Clements et al. | |

FOREIGN PATENT DOCUMENTS

| | | | |
|---|---|---|---|
| CN | 112189129 A | 1/2021 | |
| CN | 112771357 A | 5/2021 | |
| DE | 102004059730 A1 | 10/2005 | |
| EP | 0003271 A1 | 8/1979 | |
| EP | 2099264 A1 | 9/2009 | |
| EP | 2458356 A2 | 5/2012 | |
| EP | 3064917 A1 * | 9/2016 | A61B 5/01 |
| EP | 3431946 A1 | 1/2019 | |
| EP | 4155699 A1 | 3/2023 | |
| GB | 1182937 A | 3/1970 | |
| JP | 2009-192431 A | 8/2009 | |
| JP | 5368715 B2 | 12/2013 | |
| JP | 2021-22615 A | 2/2021 | |
| JP | WO2020184511 A1 | 3/2021 | |
| WO | 1999/019702 A1 | 4/1999 | |
| WO | 2014/194077 A2 | 12/2014 | |
| WO | WO-2015088024 A1 * | 6/2015 | G01K 7/00 |
| WO | WO-2016067952 A1 * | 5/2016 | G01K 7/427 |
| WO | 2016/116481 A1 | 7/2016 | |
| WO | 2021/059391 A1 | 4/2021 | |

OTHER PUBLICATIONS

Computer translation of WO_2015088024_A1 (Year: 2025).*
Extended European Search Report received for European Patent Application No. 22197480.1, mailed on May 25, 2023, 12 pages.
Extended European Search Report received for European Patent Application No. 22197502.2, mailed on Feb. 23, 2023, 9 pages.
Extended European Search Report received for European Patent Application No. 22197505.5, mailed on May 30, 2023, 12 pages.
Partial European Search Report received for European Patent Application No. 22197480.1, mailed on Feb. 20, 2023, 7 pages.
Partial European Search Report received for European Patent Application No. 22197505.5, mailed on Feb. 23, 2023, 7 pages.
Tamura et al., "Current Developments in Wearable Thermometers", Advanced Biomedical Engineering, vol. 7, 2018, pp. 88-99.
Yousef et al., "Vertical Thermopiles Embedded in a Polyimide-Based Flexible Printed Circuit Board", Journal of Microelectromechanical Systems, vol. 16, No. 6, Dec. 2007, pp. 1341-1348.
Final Office Action received for U.S. Appl. No. 17/930,057, mailed on Dec. 1, 2025, 10 pages.
Non-Final Office Action received for U.S. Appl. No. 17/930,057, mailed on Jun. 23, 2025, 11 pages.
Non-Final Office Action received for U.S. Appl. No. 17/930,041, mailed on Apr. 24, 2025, 16 pages.
Corrected Notice of Allowability received for U.S. Appl. No. 17/930,041, mailed on Oct. 23, 2025, 2 pages.
Final Office Action received for U.S. Appl. No. 17/930,053, mailed on Jul. 17, 2025, 20 pages.
Advisory Action received for U.S. Appl. No. 17/930,053, mailed on Nov. 26, 2025, 3 pages.
Kitamura, et al., "Development of a New Method for the Noninvasive Measurement of Deep Body Temperature Without a Heater", Medical Engineering & Physics, vol. 32, No. 1, 2010, pp. 1-6.
Search Report received for Chinese Patent Application No. 202211165123.1, mailed on Jul. 10, 2025, 6 pages (3 pages of English Translation and 3 pages of Official Copy).
Search Report received for Chinese Patent Application No. 202211162589.6, mailed on Jul. 5, 2025, 7 pages (4 pages of English Translation and 3 pages of Official Copy).
Search Report received for Chinese Patent Application No. 202211163270.5, mailed on Jun. 14, 2025, 7 pages (4 pages of English Translation and 3 pages of Official Copy).
Restriction Requirement received for U.S. Appl. No. 17/930,057, mailed on Apr. 30, 2025, 7 pages.
Notice of Allowance received for U.S. Appl. No. 17/930,041, mailed on Jul. 7, 2025, 8 pages.
Extended European Search Report received for European Patent Application No. 23191664.4, mailed on Jan. 26, 2024, 8 pages.
Non-Final Office Action received for U.S. Appl. No. 17/930,053, mailed on Feb. 13, 2025, 24 pages.
Restriction Requirement received for U.S. Appl. No. 17/930,057, mailed on Dec. 27, 2024, 7 pages.

* cited by examiner

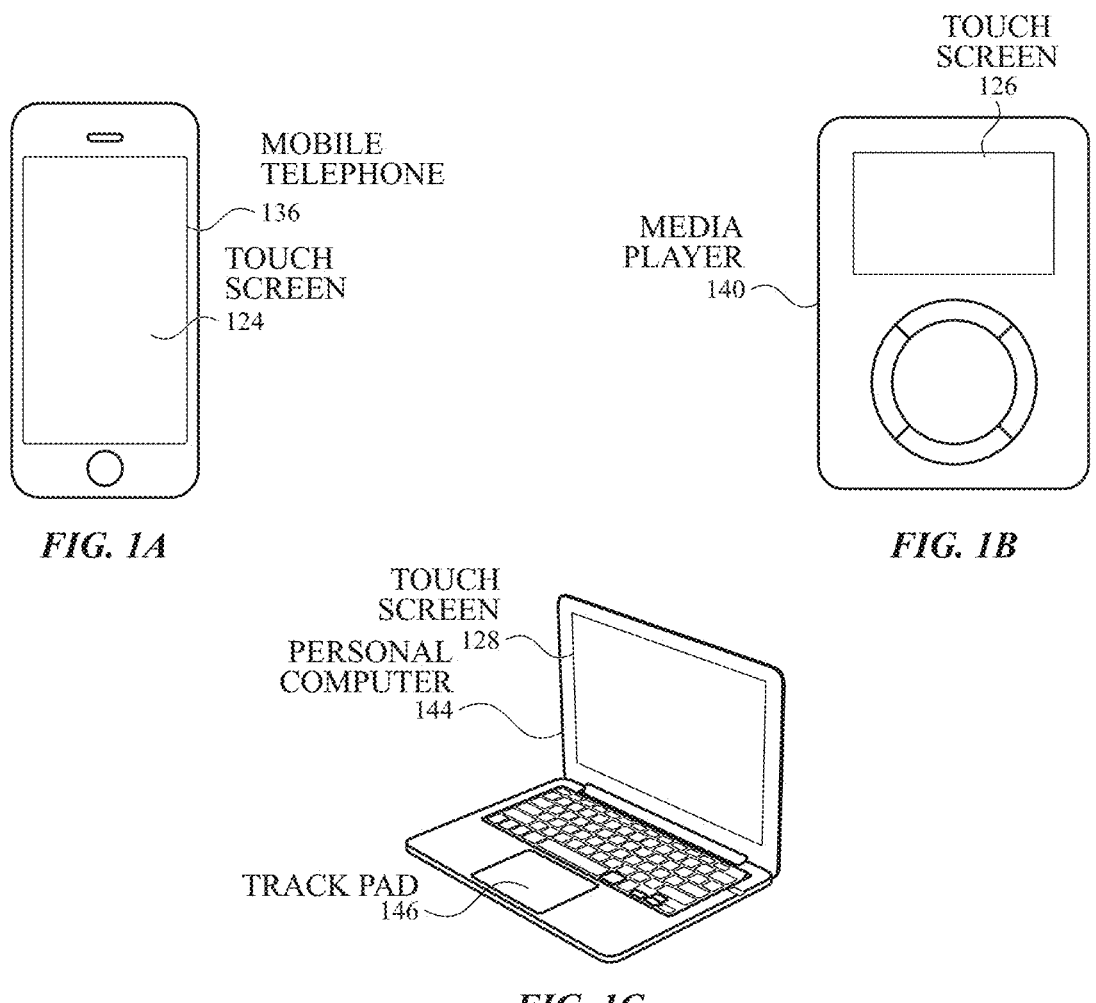
MOBILE TELEPHONE 136
TOUCH SCREEN 124
*FIG. 1A*
TOUCH SCREEN 126
MEDIA PLAYER 140
*FIG. 1B*
TOUCH SCREEN 128
PERSONAL COMPUTER 144
TRACK PAD 146
*FIG. 1C*
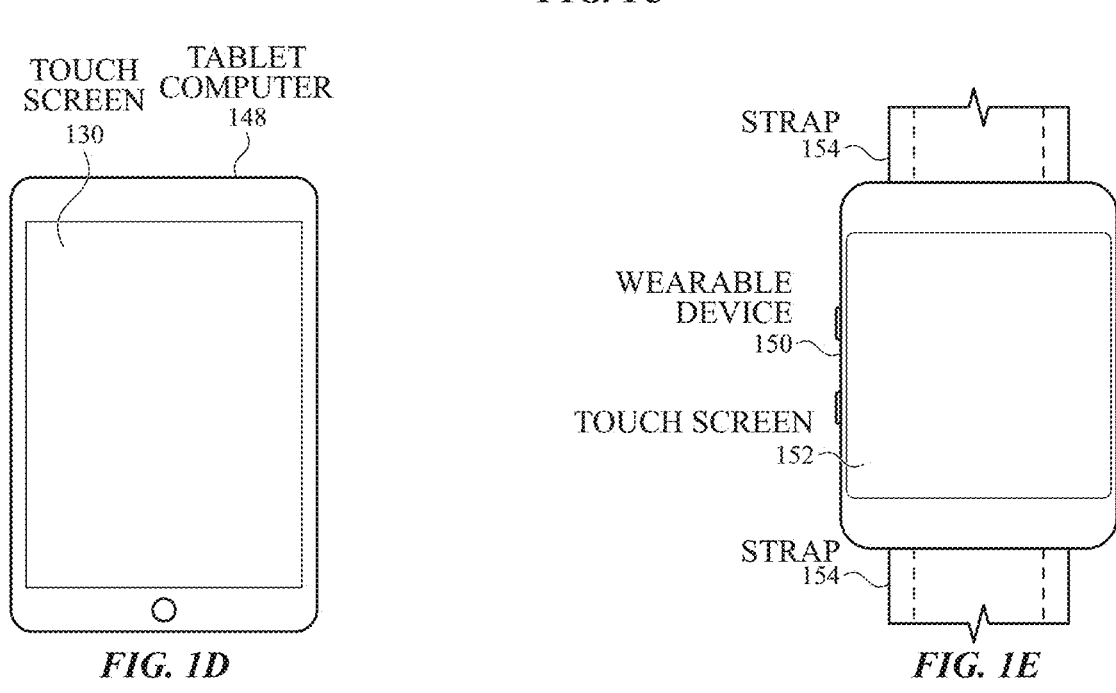
TOUCH SCREEN 130
TABLET COMPUTER 148
*FIG. 1D*
STRAP 154
WEARABLE DEVICE 150
TOUCH SCREEN 152
STRAP 154
*FIG. 1E*

DUAL HEAT FLUX SENSOR

SENSOR FOR LATERAL GRADIENT

1000

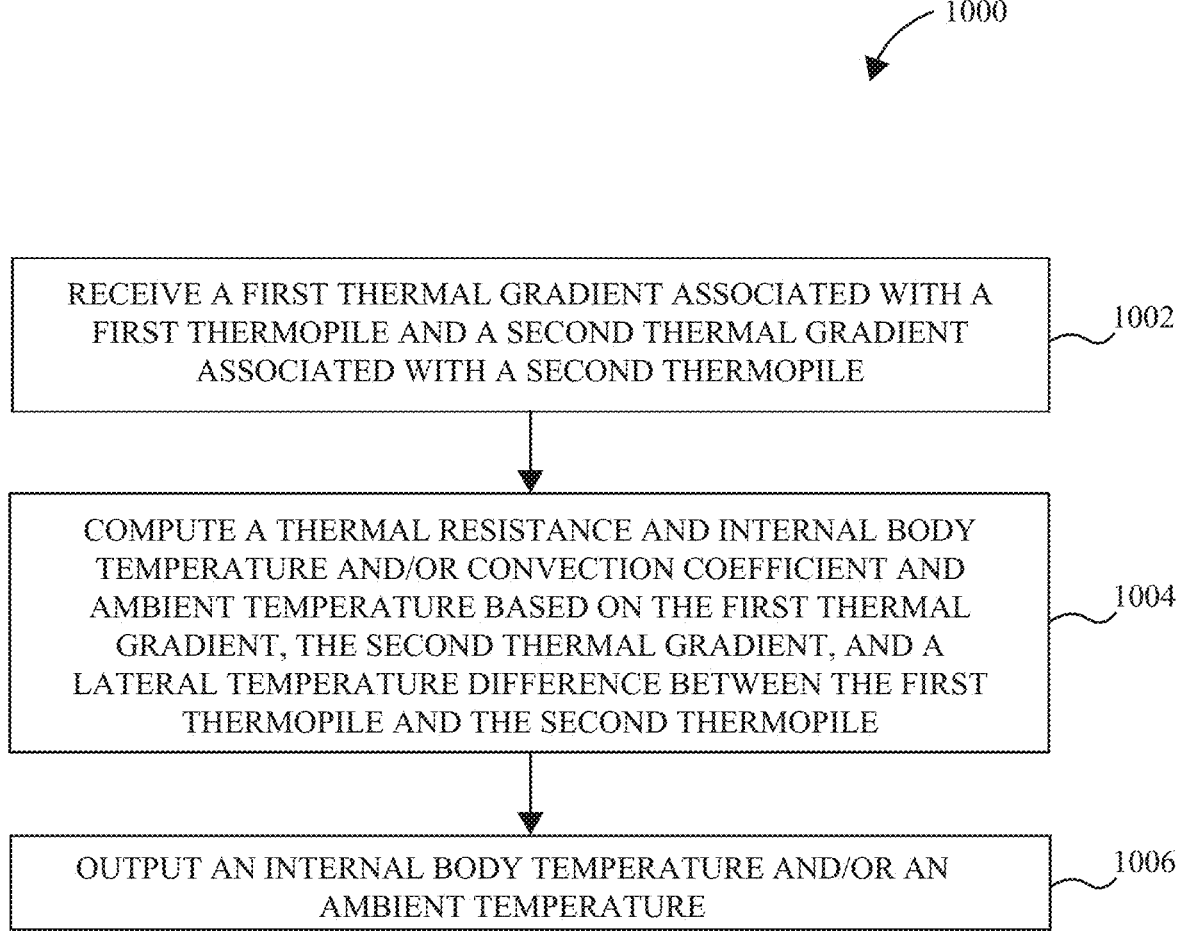

RECEIVE A FIRST THERMAL GRADIENT ASSOCIATED WITH A FIRST THERMOPILE AND A SECOND THERMAL GRADIENT ASSOCIATED WITH A SECOND THERMOPILE — 1002

COMPUTE A THERMAL RESISTANCE AND INTERNAL BODY TEMPERATURE AND/OR CONVECTION COEFFICIENT AND AMBIENT TEMPERATURE BASED ON THE FIRST THERMAL GRADIENT, THE SECOND THERMAL GRADIENT, AND A LATERAL TEMPERATURE DIFFERENCE BETWEEN THE FIRST THERMOPILE AND THE SECOND THERMOPILE — 1004

OUTPUT AN INTERNAL BODY TEMPERATURE AND/OR AN AMBIENT TEMPERATURE — 1006

*FIG. 10*

DUAL HEAT PATH TEMPERATURE SENSOR

CROSS-REFERENCE TO RELATED APPLICATIONS

This application claims the benefit of U.S. Provisional Application No. 63/371,820, filed Aug. 18, 2022, the content of which is incorporated herein by reference in its entirety for all purposes.

FIELD OF THE DISCLOSURE

This relates generally to temperature sensing systems and methods, and more particularly to temperature sensing systems and methods configured to measure internal body temperature and/or ambient temperature.

BACKGROUND OF THE DISCLOSURE

Many types of sensing devices, such as temperature sensors, are presently available in electronic devices to measure temperature or heat conditions. Electronic devices can include a wearable device to measure internal body temperature. Electronic devices can also measure ambient temperature.

SUMMARY OF THE DISCLOSURE

An electronic device, such as a wearable device, can leverage temperature gradient measurements from thermopiles to measure temperature inside or outside the electronic device. As described herein, a thermopile can include a series-connected thermocouples and output a voltage measurement that is directly proportional to a temperature gradient and/or heat flux. For example, the electronic device can include a temperature sensing system that includes at least two thermopiles, which form concentric geometries. In some examples, the temperature sensing system can include a step up in height (e.g., a height differential) between the at least two thermopiles. However, the step up in height can complicate integration within compact housing (e.g., within a smart watch) due to space considerations for the temperature sensing system.

In some examples, an improved temperature sensing system (e.g., dual heat flux sensor) that is compact in design by including thermopiles with uniform height (e.g., no step up between thermopiles) that form concentric geometries. In some examples, the improved temperature sensing system can include thermopiles with a height difference that is less than a threshold height difference (e.g., less than a difference of 10, 100, or 1000 microns in height between thermopiles). For example, the temperature sensing system can include a sensing surface (e.g., a glass layer) embedded with thermopiles, such as an inner thermopile (e.g., first thermopile) and an outer thermopile (e.g., second thermopile). A respective thermopile is associated with a respective heat path based on a temperature gradient between a top surface of the respective thermopile and a bottom surface of the respective thermopile. For example, the inner thermopile and the outer thermopile can have different heat paths (e.g., temperature gradients). Temperature gradient measurements of the thermopiles (e.g., inner thermopile, outer thermopile) can be used for determining heat flux (e.g., through an electronic device), surface temperature of objects contacting housing of the electronic device (e.g., ambient temperature), body temperature of a user wearing the electronic device, and so forth.

Processing circuitry of the temperature sensing system or processing circuitry of the electronic device (e.g., wearable device) can leverage temperature gradient measurements of the thermopiles to account for variances in thermal resistance of skin and/or air (e.g., amount of fat tissue, wind speed, humidity) to accurately determine ambient temperature and/or internal body temperature. In some examples, to accurately determine thermal resistance of skin and internal body temperature and/or thermal resistance of air and ambient temperature, the processing circuitry of the temperature sensing system or the processing circuitry of the electronic device can use a temperature gradient of the inner thermopile, a temperature gradient of the outer thermopile, a lateral temperature difference between the inner thermopile and the outer thermopile, an absolute temperature of at least one surface of the inner thermopile or the outer thermopile, surface area of a heat path associated with the inner thermopile exposed to skin and/or air, surface area of a heat path associated with the outer thermopile exposed to skin and/or air, and so forth as inputs.

BRIEF DESCRIPTION OF THE DRAWINGS

FIGS. 1A-1E illustrate example systems that can include a touch screen according to examples of the disclosure.

FIG. 10 illustrates a process for measuring internal temperature and/or ambient temperature according to some examples of the disclosure.

DETAILED DESCRIPTION

Figure 2:
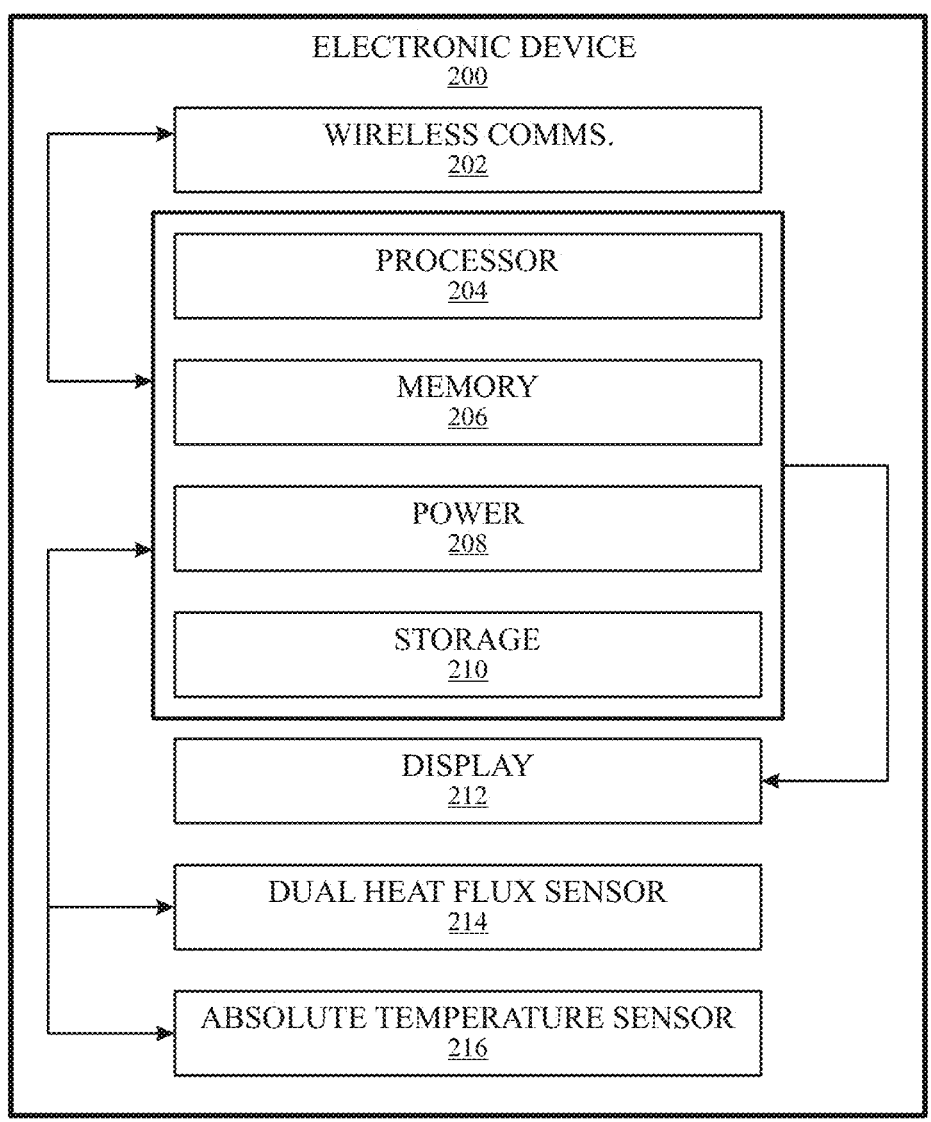
FIG. 2 illustrates a block diagram of an example electronic device according to examples of the disclosure.

In the following description of examples, reference is made to the accompanying drawings which form a part hereof, and in which it is shown by way of illustration specific examples that can be practiced. It is to be understood that other examples can be used, and structural changes can be made without departing from the scope of the disclosed examples.

This relates to a temperature sensing system (e.g., dual heat flux sensor) that is compact in design by including thermopiles that form concentric geometries and are uniform in height (e.g., no step up between thermopiles). In some examples, the temperature sensing system can include thermopiles with a height difference that is less than a threshold height difference (e.g., less than a difference of 10, 100, or 1000 microns in height between thermopiles). Processing circuitry of the temperature sensing system or processing circuitry of an electronic device (e.g., wearable device) can leverage temperature gradient measurements of the thermopiles to account for variances in thermal resistance of skin and/or air (e.g., amount of fat tissue, wind speed, humidity) to accurately determine ambient temperature and/or internal body temperature. In some examples, to accurately determine thermal resistance of skin and internal body temperature and/or thermal resistance of air and ambient temperature, the processing circuitry of the temperature sensing system or the processing circuitry of the electronic device can use a temperature gradient of the inner thermopile, a temperature gradient of the outer thermopile, a lateral temperature difference between the inner thermopile and the outer thermopile, an absolute temperature of at least one surface of the inner thermopile or the outer thermopile, surface area of a heat path associated with the inner thermopile exposed to skin and/or air, surface area of a heat path associated with the outer thermopile exposed to skin and/or air, and so forth as inputs. In some examples, rather than using temperature gradients from thermopiles, at least four absolute temperature sensors configured to measure respective absolute temperatures can be used to determine internal body temperature and/or ambient temperature. Accordingly, in some examples, the temperature sensing system can include four absolute temperature sensors forming a concentric ring structure. For example, a first absolute temperature sensor can measure a first absolute temperature at a first surface (e.g., bottom surface) of the inner thermopile, a second absolute temperature sensor can measure a second absolute temperature at a first surface (e.g., bottom surface) of the outer thermopile, a third absolute temperature sensor can measure a third absolute temperature at a second surface (e.g., top surface) of the inner thermopile, and a fourth absolute temperature sensor can measure a fourth absolute temperature at a second surface (e.g., top surface) of the outer thermopile. In some examples, using the first absolute temperature, the second absolute temperature, the third absolute temperature, and the fourth absolute temperature, the processing circuitry of the temperature sensing system or the processing circuitry of the electronic device can determine thermal resistance of skin and internal body temperature and/or thermal resistance of air and ambient temperature. In some examples, the processing circuitry of the temperature sensing system or the processing circuitry of the electronic device can determine thermal resistance of skin and internal body temperature and/or thermal resistance of air and ambient temperature using the temperature gradient of the inner thermopile, the temperature gradient of the outer thermopile, and least two absolute temperatures (e.g., first and second absolute temperatures, first and third absolute temperatures, third and fourth absolute temperatures, and so forth). In some examples, the processing circuitry of the temperature sensing system or the processing circuitry of the electronic device can determine thermal resistance of skin and internal body temperature and/or thermal resistance of air and ambient temperature using any suitable combination of the temperature gradient of the inner thermopile, the temperature gradient of the outer thermopile, the lateral temperature difference between the inner thermopile and the outer thermopile, and one or more absolute temperatures.

FIGS. 1A-1E illustrate examples of systems, optionally with touch screens (e.g., capacitive touch screens), that can include an example temperature sensing system according to examples of the disclosure. FIG. 1A illustrates an example mobile telephone 136 that optionally includes a touch screen 124 and can include an example temperature sensing system according to examples of the disclosure. FIG. 1B illustrates an example digital media player 140 that optionally includes a touch screen 126 and can include an example temperature sensing system according to examples of the disclosure. FIG. 1C illustrates an example personal computer 144 that optionally includes a touch screen 128 and can include an example temperature sensing system according to examples of the disclosure. FIG. 1D illustrates an example tablet computing device 148 that optionally includes a touch screen 130 and can include an example temperature sensing system according to examples of the disclosure. FIG. 1E illustrates an example wearable device 150 (e.g., a watch) that optionally includes a touch screen 152 and can include an example temperature sensing system according to examples of the disclosure. Wearable device 150 can be coupled to a user via strap 154 or any other suitable fastener. It should be understood that the example devices illustrated in FIGS. 1A-1E are provided by way of example, and other devices can include an example temperature sensing system according to examples of the disclosure. Additionally, although the devices illustrated in FIGS. 1A-1E include touch screens, in some examples, the devices may have a non-touch sensitive display or no display.

FIG. 2 illustrates a block diagram of an example electronic device 200, according to examples of the disclosure. The electronic device 200 can measure and/or display ambient temperature and/or internal body temperature based on temperature measurements from the temperature sensing system (e.g., dual heat flux sensor 214 and absolute temperature sensor 216). The electronic device 200 can be included in, for example, mobile telephone 136, digital media player 140, personal computer 144, tablet computing device 148, wearable device 150, or any mobile or non-mobile computing device.

In some examples, the electronic device 200 can include an integrated display (e.g., touch screen) 212 to display images and to detect touch and/or proximity (e.g., hover) events from an object (e.g., active or passive stylus or finger) at or proximate to the surface of the display 212.

In some examples, the electronic device 200 can include a power source 208 (e.g., energy storage device such as a battery), processor 204, program storage device 210 and/or memory 206, wireless communication circuitry 202, and a temperature sensing system (e.g., a dual heat flux sensor 214 and absolute temperature sensor 216). The processor 204 can control some or all of the operations of the electronic device 200. The processor 204 can communicate, either directly or indirectly, with some or all of the other components of the electronic device 200. For example, a system bus or other communication mechanism can provide communication between the power source 208, the processor 204, the display 212, the program storage device 210, the memory 206, the wireless communication circuitry 202, and the temperature sensing system (e.g., a dual heat flux sensor 214 and absolute temperature sensor 216).

The processor 204 can be implemented as any electronic device capable of processing, receiving, or transmitting data or instructions, whether such data or instructions is in the form of software or firmware or otherwise encoded. For example, the processor 204 can include a microprocessor, a central processing unit (CPU), an application-specific integrated circuit (ASIC), a digital signal processor (DSP), a controller, or a combination of such devices. As described herein, the term "processor" or "processing circuitry" is meant to encompass a single processor or processing unit, multiple processors, multiple processing units, or other suitably configured computing element or elements. In some examples, processor 204 can provide part or all of the processing systems or processors described with reference to any of FIGS. 3-8.

The processor 204 can receive touch input to the display 212 or other input devices and perform actions based on the outputs. For example, the processor 204 can be connected to the program storage 210 (and/or memory 206) and a display controller/driver to generate images on the display screen. The display screen includes, but is not limited to, Liquid Crystal Display (LCD) displays, Light-Emitting Diode (LED) displays, including Organic LED (OLED), Active-Matrix Organic LED (AMOLED), Passive-Matrix Organic LED (PMOLED) displays, a projector, a holographic projector, a retinal projector, or other suitable display. In some examples, the display driver can provide voltages on select (e.g., gate) lines to each pixel transistor and can provide data signals along data lines to these same transistors to control the pixel display image for the display 212.

The processor 204 can cause a display image on the display 212, such as a display image of a user interface (UI) or display a notification indicating ambient temperature and/or internal body temperature, and can use touch processor and/or touch controller to detect a touch on or near the display 212, such as a touch input to the displayed UI when the electronic device 200 includes a touch screen. The touch input can be used by computer programs stored in program storage 210 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The processor 204 can also perform additional functions that may not be related to touch processing or temperature sensing.

Note that one or more of the functions described in this disclosure can be performed by firmware stored in memory 206 and/or stored in program storage 210 and executed by the processor 204 or other processing circuitry of the electronic device 200. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, the program storage 210 and/or memory 206 can be a non-transitory computer readable storage medium. The non-transitory computer readable storage medium (or multiple thereof) can have stored therein instructions, which when executed by the processor 204 or other processing circuitry, can cause the device including the computing electronic device 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The power source 208 can be implemented with any device capable of providing energy to the electronic device 200. For example, the power source 208 can include one or more batteries or rechargeable batteries. Additionally or alternatively, the power source 208 can include a power connector or power cord that connects the electronic device 200 to another power source, such as a wall outlet.

The memory 206 can store electronic data that can be used by electronic device 200. For example, memory 206 can store electrical data or content such as, for example, audio and video files, documents and applications, device settings and user preferences, timing signals, control signals, and data structures or databases. The memory 206 can include any type of memory. By way of example only, the memory 206 can include random access memory, read-only memory, Flash memory, removable memory, other types of storage elements, or combinations of such memory types.

The dual heat flux sensor 214 can measure voltage associated with a thermopile that is directly proportional to a temperature gradient and/or heat flux. The absolute temperature sensor 216 can measure temperature at given locations (e.g., top surface of outer thermopile, bottom surface of outer thermopile, top surface of inner thermopile, bottom surface of inner thermopile). In addition to the dual heat flux sensor 214 and absolute temperature sensor 216, the electronic device 200 can include sensing device(s) that can include sensors circuitry configured to sense one or more types of parameters, such as but not limited to, vibration; light; touch; force; heat; movement; relative motion; biometric data (e.g., biological parameters) of a user; air quality; proximity; position; connectedness; and so on. In some examples, the sensing device(s) can include an image sensor such as an outward facing camera, a radiofrequency sensor (and/or transmitter), an infrared sensor (and/or transmitter), a magnetic sensor (and/or generator) (e.g., a magnetometer), an ultrasonic sensor (and/or transmitter), and/or an inertial measurement unit. In some examples, the sensing device(s) can further include other sensor(s) including a force sensor, a heat sensor, a position sensor, a light or optical sensor, an accelerometer, a pressure transducer, a gyroscope, an acoustic sensor, a health monitoring sensor, and/or an air quality sensor, among other possibilities. Additionally, the one or more sensors of the sensing device(s) can utilize any suitable sensing technology, including, but not limited to, interferometric, magnetic, capacitive, ultrasonic, resistive, optical, acoustic, piezoelectric, or thermal technologies.

Wireless communication circuitry 202 can transmit or receive data from another electronic device. Although wireless communication circuitry 202 is illustrated and described, it is understood that other wired communication interfaces may be used. In some examples, the wireless and/or wired communications interfaces can include, but are not limited to, cellular, Bluetooth, and/or Wi-Fi communications interfaces. Although not shown, the electronic device 200 can also include other input/output mechanisms including one or more touch sensing input surfaces, a crown, one or more physical buttons, one or more microphones or speakers, one or more ports such as a microphone port, and/or a keyboard.

It should be apparent that the architecture shown in FIG. 2 is only one example architecture of the electronic device 200 and that the device could have more or fewer components than shown, or a different configuration of components. The various components shown in FIG. 2 can be implemented in hardware, software, firmware, or any combination thereof, including one or more signal processing and/or application specific integrated circuits.

Figure 3:
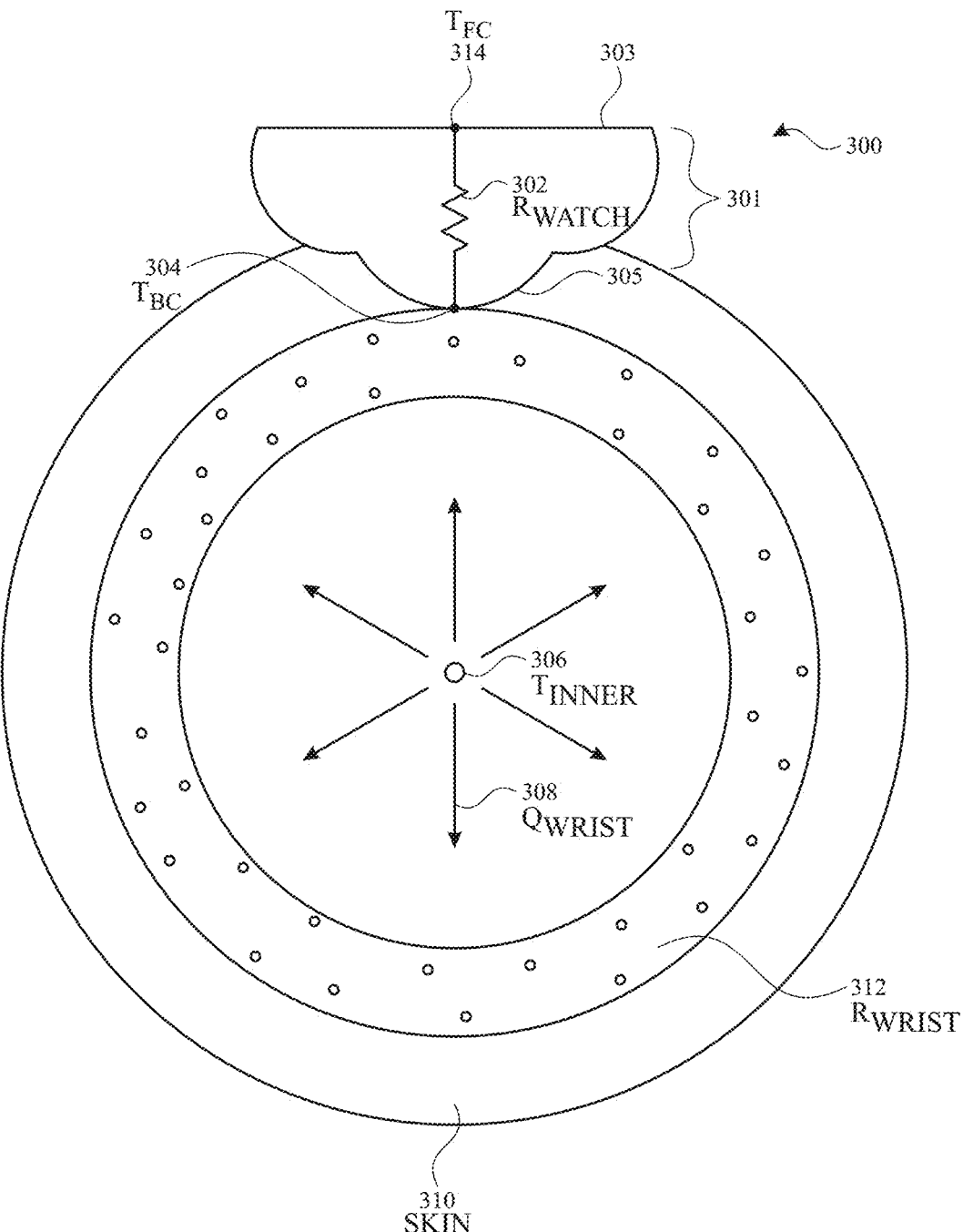
FIG. 3 illustrates an example wearable device that includes an example temperature sensing system to measure thermal resistance of skin and internal body temperature according to examples of the disclosure.

In some examples, an electronic device (e.g., wearable device) can simultaneously determine thermal resistance of skin and internal body temperature. As such, FIG. 3 illustrates wearable device 300 configured to measure thermal resistance of skin (e.g., $R_{wrist}$) 312 and internal body temperature 306. The wearable device 300 can correspond to a device 150 of FIG. 1E (or more generally can correspond to any of the electronic devices illustrated by FIGS. 1A-1E). Wearable device 300 can include a housing 301 secured to a user via a strap or any other suitable fastener (e.g., corresponding to strap 154). In some examples, the wearable device 300 can be secured to a user (e.g., exposed skin on the user's body). The wearable device 300 can correspond to a watch, a fitness tracker, or any other device (e.g., optionally used to measure physiological signals associated with the user). The wearable device 300 can attach to the user around the wrist (e.g., corresponding to layer of skin at a user's wrist 310), head, over the eyes, or on any exposed surface of the body that is suitable for measuring physiological signals (e.g., internal body temperature 306) associated with the user.

The wearable device 300 can include a front face 303, the housing 301 and a back face 305. The front face 303 is sometimes referred to herein as the "front crystal" of the wearable device 300, and the back face 305 is sometimes referred to herein as the "back crystal" of the wearable device 300. However, it should be understood that the front face 303 and back face 305 generally refer to a substrate such as glass, plastic, resin, gel, or crystal. For example, the front face 303 and the back face 305 (also referred to as a rear face) can protect internal components of the wearable device 300, but also allow for optical transmission from a display screen (e.g., touch screen) and/or optical sensors. In some examples, the temperature sensing system within the wearable device 300 can be used to measure temperatures associated with a touch screen located at the front face 303. In such examples, the temperature sensing system can be configured to measure the temperature at a location or region inside wearable device 300 (e.g., optionally closer to the front face 303). Alternatively, or additionally, the temperature sensing system can be used to measure the temperature outside of wearable device 300, such as the temperature of air contacting the front face 303, or the temperature of other objects at least partially in contact with, or overlapping the front face 303, as described in FIG. 4.

In some examples, the temperature sensing system within the wearable device 300 can be used to measure temperatures associated with an optical system located at the back face 305. In such examples, the temperature sensing system can be configured to measure the temperature at a location or region inside the wearable device 300 (e.g., optionally closer to the back face 305). Alternatively, or additionally, the temperature sensing system can be used to measure the temperature outside of the wearable device 300, such as the temperature of air contacting back face as described in FIG. 4, or the temperature of other objects at least partially in contact with, or overlapping, back face (e.g., skin temperature at the wrist). Finally, the temperature sensing system can be used to measure the temperature at any location within wearable device 300, as well as the temperature of objects outside wearable device 300 (e.g., the air surrounding wearable device as described in FIG. 4), or objects at least partially in contact with the front face 303, the back face 305, or the housing 301).

In some examples, a sensing glass, a printed circuit board (PCB), and the like can be disposed inside the housing 301. For example, the sensing glass or the printed circuit board (PCB) can be located inside the wearable device 300, at the front face 303 (sometimes referred to as a "front crystal"). The printed circuit board (PCB) can include optical sensors configured to emit light and detect light through the front face 303. In some examples, the sensing glass or the printed circuit board (PCB) can be used to implement a touch sensor panel, display or touch screen (e.g., touch screen 152) disposed below the front face 303. In some examples, the sensing glass or the printed circuit board (PCB) can include a processor (e.g., corresponding to processor 204), program storage (e.g., corresponding to program storage 210), optionally a touch and display controller, and/or temperature sensing devices (e.g., thermopiles of the dual heat flux sensor 214, absolute temperature sensor 216). In some examples, the sensing glass or the printed circuit board (PCB) can additionally or alternatively include one or more discrete absolute temperature sensors.

In some examples, the sensing glass or the printed circuit board (PCB) can be located inside the wearable device 300, at the back face 305 (sometimes referred to as a "back crystal"). The printed circuit board (PCB) can include optical sensors configured to emit light and detect light through the back face. It should be understood that the number of sensing glass layers or printed circuit boards (PCBs), placement of sensing glass or the printed circuit boards PCBs, and distribution of components within the wearable device 300 is non-limiting.

In some cases, measurements of internal body temperature ($T_{inner}$) 306 can be susceptible to error from variances in thermal resistance of skin (e.g., person-to-person variations in skin properties such as fat tissue corresponding to $R_{wrist}$ 312). Accordingly, the sensing glass or the printed circuit board of the wearable device 300 can include thermopile(s) (e.g., inner and outer thermopiles). Each of the thermopile(s) can generate a temperature differential or gradient measurement between a bottom surface of the sensing glass or printed circuit board (PCB) and a top surface of the sensing glass or printed circuit board (e.g., when through-hole vias are used to form the thermopile(s)). For example, the inner thermopile and the outer thermopile can have different heat paths (e.g., temperature gradients). Temperature gradient measurements of the thermopiles (e.g., inner thermopile, outer thermopile) can be used for determining heat flux through a user wrist's ($Q_{wrist}$) 308.

Given the heat flux associated with the inner thermopile, heat flux associated with the outer thermopile, temperature of the front crystal ($T_{fc}$) 314, temperature of the back crystal ($T_{bc}$) 304, and resistance of the wearable device 300, such as a watch (e.g., $R_{watch}$) 302, the temperature sensing system can simultaneously measure the thermal resistance of skin, such as resistance associated with fat tissue of user's wrist (e.g., $R_{wrist}$) 312, and the internal body temperature ($T_{inner}$) 306 of a user. In some examples, using the heat flux associated with the inner thermopile, heat flux associated with the outer thermopile, temperature of the front crystal, ($T_{fc}$) 314, temperature of the back crystal ($T_{bc}$) 304, and resistance of the wearable device 300, such as a watch (e.g., $R_{watch}$) 302 as inputs, processing circuitry of the temperature sensing system and/or the wearable device 300 can simultaneously measure the thermal resistance of skin (e.g., $R_{wrist}$) 312 and the internal body temperature ($T_{inner}$) 306 of a user. Rather than assuming thermal resistance of skin (e.g., $R_{wrist}$) 312 (e.g., such as using a lookup table of varying $R_{wrist}$ values) and without taking into account person-to-person variations in skin properties to determine internal body temperature ($T_{inner}$) 306, a temperature sensing system that includes at least inner and outer thermopiles can be used to accurately determine the thermal resistance of skin (e.g., $R_{wrist}$) 312 and internal body temperature ($T_{inner}$) 306 of the user. In some examples, the wearable device 300 and/or the temperature sensing system can include any suitable number and arrangement of absolute temperature sensors. An absolute temperature sensor placed at the front crystal of the wearable device 300 (e.g., watch) can measure temperature at the front crystal ($T_{fc}$) 314, and an absolute temperature sensor temperature placed at the back crystal of the wearable device 300 (e.g., watch) can measure temperature at the back crystal ($T_{bc}$) 304.

Figure 4:
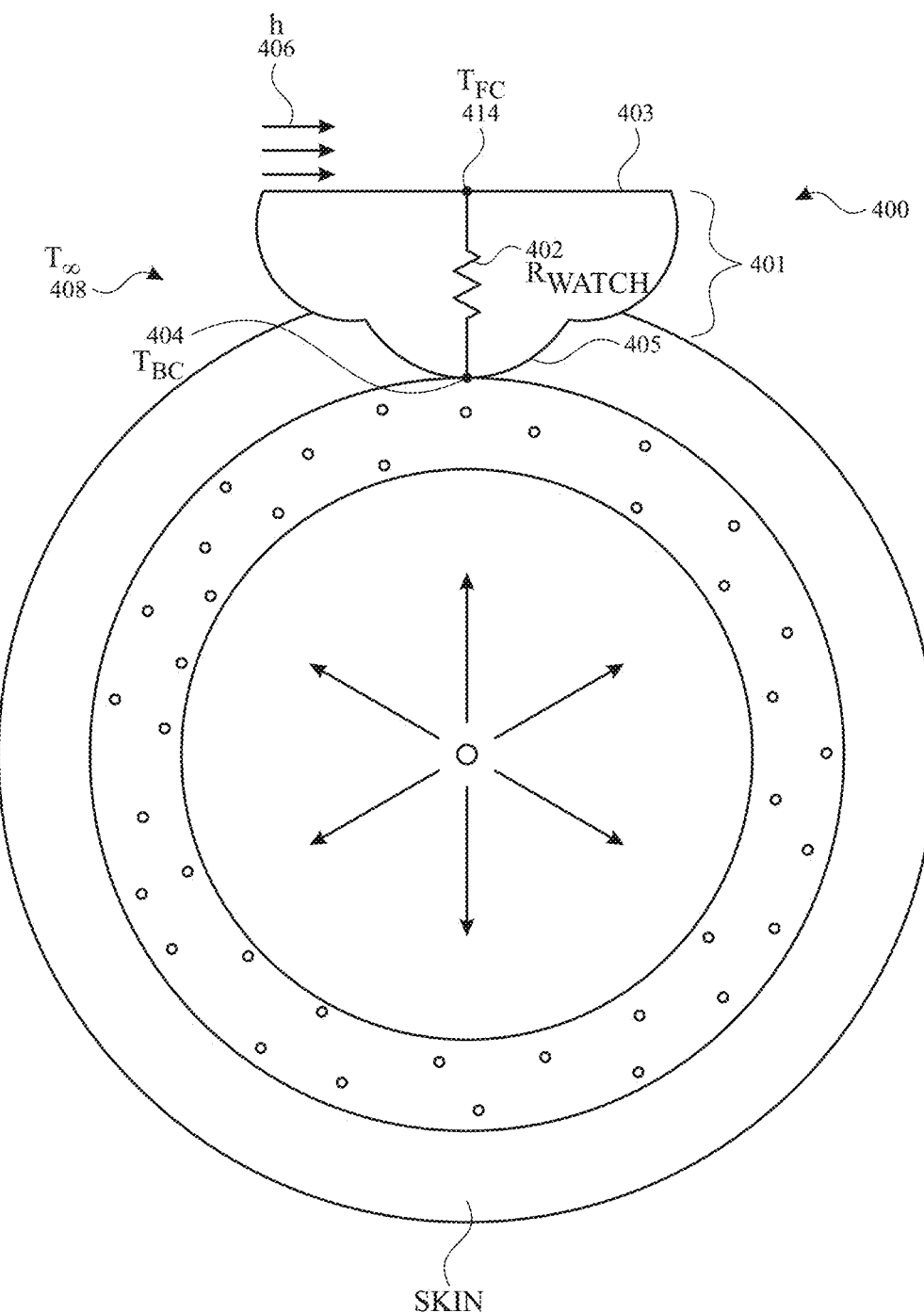
FIG. 4 illustrates an example wearable device that includes an example temperature sensing system to measure thermal resistance of air and ambient temperature according to examples of the disclosure.

In some examples, an electronic device (e.g., wearable device) can also simultaneously determine thermal resistance of air (e.g., convection coefficient) and ambient temperature. As such, FIG. 4 illustrates wearable device 400 configured to measure thermal resistance of air (h) 406 ambient temperature ($T_{\infty}$) 408. The wearable device 400 corresponds to the wearable device 300 described in FIG. 3, thereby includes a housing 401, a front face 403, and a back face 405.

Measurements of ambient temperature ($T_{\infty}$) 408 can be susceptible to error from variances in thermal resistance of air (e.g., wind speed and humidity corresponding to h 406). Accordingly, sensing glass or the printed circuit board (PCB) of the wearable device 400 can include thermopile(s) (e.g., inner and outer thermopiles). Each of the thermopile(s) can generate a temperature differential or gradient measurement between a bottom surface of the sensing glass or printed circuit board (PCB) and a top surface of the sensing glass or printed circuit board (e.g., when through-hole vias are used to form the thermopile(s)). For example, the inner thermopile and the outer thermopile can have different heat paths (e.g., temperature gradients). Temperature gradient measurements of the thermopiles (e.g., inner thermopile, outer thermopile) can be used for determining heat flux associated with the inner thermopile and the outer thermopile.

Given heat flux associated with the inner thermopile, heat flux associated with the outer thermopile, temperature of the front crystal ($T_{fc}$) 414, temperature of the back crystal ($T_{bc}$) 404, and resistance of the wearable device 400, such as a watch (e.g., $R_{watch}$) 402, the temperature sensing system can simultaneously measure the thermal resistance of air (h) 406 and the ambient temperature ($T_{\infty}$) 408. In some examples, using the heat flux associated with the inner thermopile, heat flux associated with the outer thermopile, temperature of the front crystal ($T_{fc}$) 414, temperature of the back crystal ($T_{bc}$) 404, and resistance of the wearable device 400, such as a watch (e.g., $R_{watch}$) 402 as inputs, processing circuitry of the temperature sensing system and/or the wearable device 400 can simultaneously measure the thermal resistance of air (h) 406 and the ambient temperature ($T_{\infty}$) 408. Rather than assuming thermal resistance of air (h) 406 to determine the ambient temperature ($T_{\infty}$) 408, a temperature sensing system that includes at least inner and outer thermopiles can be used to accurately determine the thermal resistance of air (h) 406 and the ambient temperature ($T_{\infty}$) 408. In some examples, the wearable device 400 and/or the temperature sensing system can include any suitable number and arrangement of absolute temperature sensors. An absolute temperature sensor placed at the front crystal of the wearable device 400 (e.g., watch) can measure temperature at the front crystal ($T_{fc}$) 414, and an absolute temperature sensor temperature placed at the back crystal of the wearable device 300 (e.g., watch) can measure temperature at the back crystal ($T_{bc}$) 404.

Figure 5:
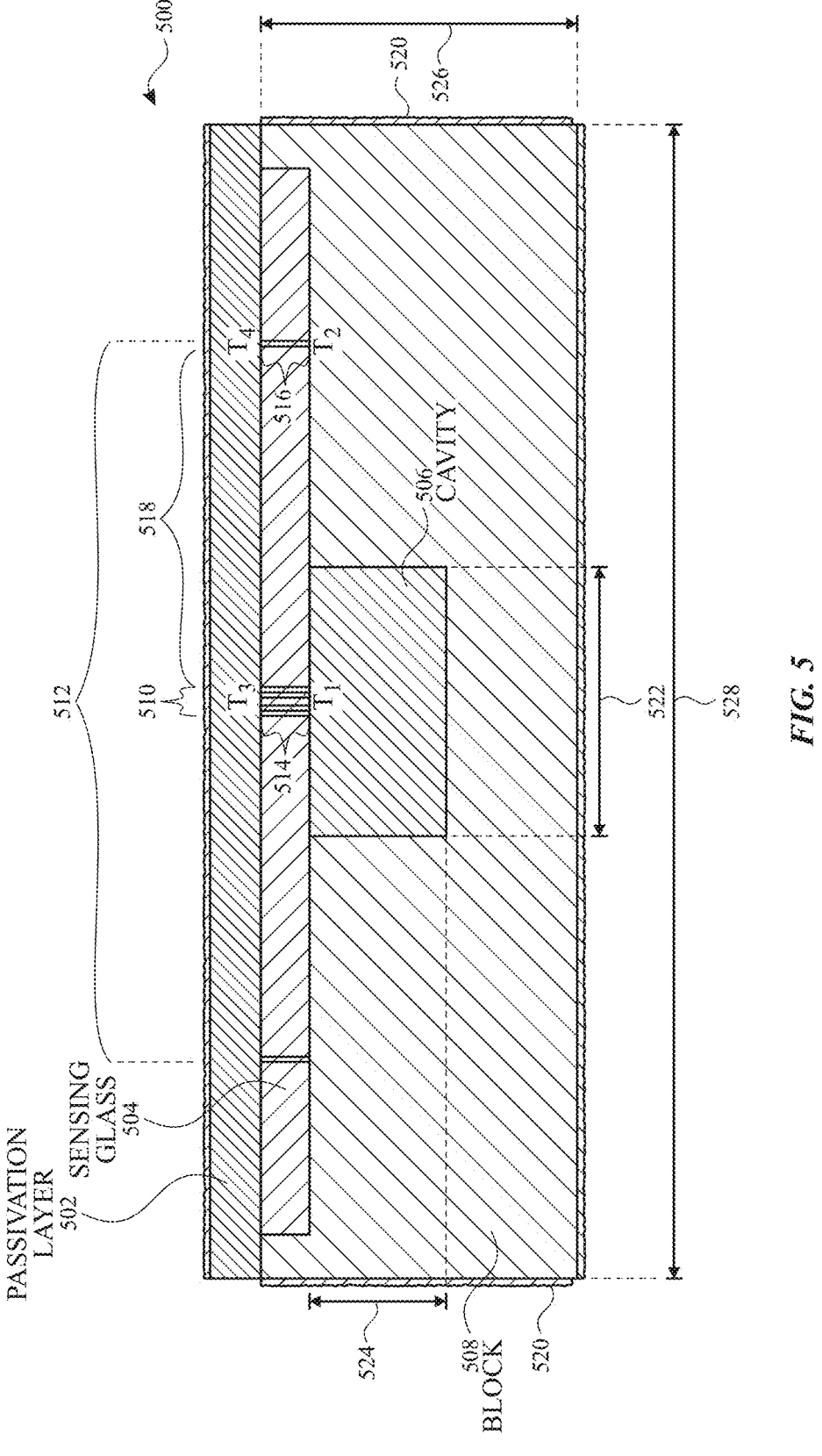
FIG. 5 illustrates a cross-section of an example temperature sensing system according to examples of the disclosure.

FIG. 5 illustrates a cross-section of an example temperature sensing system according to examples of the disclosure. A temperature sensing system (e.g., dual heat flux sensor) 500 can include at least a block (e.g., housing) 508 and sensing glass 504 (also referred to as a first glass substrate) embedded with an inner thermopile 510 and an outer thermopile 512. In some examples, the sensing glass 504 can be disposed within or coupled to the block 508. In some examples, the temperature sensing system can also include passivation layer 502 (also referred to as a passivation glass or a second glass substrate, when the passivation layer material is glass), a cavity 506 disposed within the block 508, thermal insulation layer(s) 520, absolute temperature sensor(s), and/or additional thermopiles. It should be noted that the number and distribution of components within the temperature sensing system 500 is non-limiting.

The sensing glass 504 can include the inner thermopile 510 and the outer thermopile 512. As described above, the inner thermopile 510 and the outer thermopile 512 separately measure heat flux, which is used to determine internal body temperature and/or ambient temperature. In some examples, a temperature gradient associated with the inner thermopile 510 ($T_3-T_1$) can be different than the temperature gradient associated with the outer thermopile 512 ($T_4-T_2$). $T_3-T_1$ represents a temperature gradient between a top surface of the inner thermopile 510 and a bottom surface of the inner thermopile 510. $T_4-T_2$ represents a temperature gradient between a top surface of the outer thermopile 512 and a bottom surface of the outer thermopile 512. Although not illustrated, the temperature sensing system 500 can include any number of absolute temperature sensors. For example, the temperature sensing system 500 can include a first absolute temperature located near $T_3$ to measure temperature at a top surface of the inner thermopile 510, a second absolute temperature located near $T_1$ to measure temperature at a bottom surface of the inner thermopile 510, a third absolute temperature located near $T_4$ to measure temperature at a top surface of the outer thermopile 512, and a fourth absolute temperature located near $T_2$ to measure temperature at a bottom surface of the outer thermopile 512. In some examples, the inner thermopile 510 has a diameter between 0.01-10 millimeters. In some examples, the inner thermopile 510 has a diameter of 0.01, 0.003, 0.055, 0.1, 0.5, 1, or 1.5 millimeters. In some examples, the outer thermopile 512 has a diameter between 0.05-15 millimeters. In some examples, the outer thermopile 512 has a diameter of 0.05, 0.5, 1 3, 5, 8 or 10 millimeters. In some examples and as illustrated in FIG. 5, the inner thermopile 510 and the outer thermopile 512 can include through hole thermopiles, which traverse the sensing glass 504 from top to bottom. In some examples, the inner thermopile 510 and the outer thermopile 512 can include blind thermopiles, buried thermopiles, and/or micro-thermopiles. In some examples, the height 514 of the inner thermopile 510 and the height 516 of the outer thermopile 512 can be between 0.1-5 millimeters. In some examples, height 514 and height 516 can be 0.1, 0.5, 1.5, 2, 3, or 5 millimeters. It should be appreciated that height 514 of the inner thermopile 510 and height 516 of the outer thermopile 512 are shown to be equal. By having no step up or height difference between the inner thermopile 510 and the outer thermopile 512, the temperature sensing system can be thinner, more compact, less expensive to manufacture, and easier to integrate into compact housings (e.g., watch). It is understood that, in some examples, there can be a small height differential within the manufacturing tolerance.

In some examples, passivation layer 502 can be disposed above the sensing glass 504 (e.g., near the front crystal of a wearable device). The passivation layer 502 can prevent electrical shorting between the wearable device (e.g., including the temperature sensing system 500) and the environment. In some examples, passivation layer 502 can also be disposed near the back crystal of the wearable device. In some examples, the passivation layer 502 includes epoxy, glass, a polymer material, a ceramic material (e.g., silicon nitride), a composite material, and so forth. In some examples, the passivation layer 502 has a height between 100 nanometers and 1 millimeter. In some examples, the passivation layer 502 has a height of 100 nanometers, 500 nanometers, 1000 nanometers, 10 microns, 100 microns, or 1000 microns. In some examples, lateral (e.g., vertical) edge(s) of the temperature sensing system include thermal insulation layer(s) 520. In some examples, the thermal insulation layer(s) 520 can be external to the block 508. In some examples, the thermal insulation layer(s) 520 are disposed a threshold distance (0.5, 1, 2, 3, 5, etc. millimeters) from the outer thermopile 512. The thermal insulation layer(s) 520 can include epoxy, glass, plastic, and so forth to prevent electrical shorting. The thermal insulation layers(s) 520 can have a diameter between 100 nanometers and 1 millimeter. In some examples, the thermal insulation layers(s) 520 can have a diameter of 100 nanometers, 500 nanometers, 1000 nanometers, 10 microns, 100 microns, or 1000 microns.

In some examples, the cavity 506 can be disposed below the sensing glass 504 and within the block 508. The cavity 506 can include an air cavity or a vacuum cavity. In some examples, a glass layer 506 that is different from the sensing glass 504 and/or the passivation layer 502 can be disposed below the sensing glass 504 and within the block 508. The cavity or glass layer 506 can have a diameter 522 between 0.5 to 6 millimeters. In some examples, the cavity or glass layer 506 can have a diameter of 0.5, 1, 1.5, 2, 3, 4, 5, or 6 millimeters. The cavity or glass layer 506 can have a height between 0.1 to 3 millimeters. In some examples, the cavity or glass layer 506 can have a height 524 of 0.1, 0.5, 1, 1.5, 2, 2.5, or 3 millimeters. In some examples, a diameter 528 of the temperature sensing system 500 is at least 1.5 times greater than the diameter of the outer thermopile 512. In some examples, the diameter 528 of the temperature sensing system 500 can be between 6 and 15 millimeters. In some examples, the diameter 528 of the temperature sensing system 500 can be between 9 and 12 millimeters. In some examples, a height 526 of the temperature sensing system 500 can be between 3.5 and 5 millimeters. In some examples, a height 526 of the temperature sensing system 500 is less than 4 millimeters. It is understood that the diameters and heights or ranges of diameters and heights can be different than those above, depending on the size requirements of the temperature sensing system.

In some examples, the temperature sensing system 500 can include any number and arrangement of absolute temperature sensors and thermopiles. In some examples, in addition to a temperature gradient (e.g., heat flux, $T_3-T_1$) associated with the inner thermopile 510 and a temperature gradient (e.g., heat flux, $T_4-T_2$) associated with the outer thermopile 512, a lateral temperature difference 518 ($T_4-T_3$) or ($T_2-T_1$) between the inner thermopile 510 and the outer thermopile 512 as well as at least one absolute temperature (e.g., $T_1$, $T_2$, $T_3$, or $T_4$) are used to determine thermal resistance of skin and internal body temperature. In some examples, the temperature gradient (e.g., heat flux) associated with the inner thermopile 510, the temperature gradient (e.g., heat flux) associated with the outer thermopile 512, and the lateral temperature difference 518 between the inner thermopile 510 and the outer thermopile 512 can also be used to determine thermal resistance of air and ambient temperature. In some examples, the lateral temperature difference 518 can be measured using an additional surface thermopile disposed between the inner thermopile and the outer thermopile (e.g., along a surface of sensing glass 504). In some examples, a first absolute temperature sensor can be disposed at a bottom surface of the inner thermopile 510 to measure $T_1$ and a second absolute temperature sensor can be disposed at a bottom surface of the outer thermopile 512 to measure $T_2$. Based on a temperature associated with the bottom surface of the inner thermopile 510, and a temperature associated with the bottom surface of the outer thermopile 512, lateral temperature difference 518 (e.g., $T_1-T_2$) can be determined. In some examples, a third absolute temperature sensor can be disposed at a top surface of the inner thermopile 510 to measure $T_3$ and a fourth absolute temperature sensor can be disposed at a bottom surface of the outer thermopile 512 to measure $T_4$. Based on a temperature associated with the top surface of the inner thermopile 510, and a temperature associated with the top surface of the outer thermopile 512, lateral temperature difference 518 (e.g., $T_3-T_4$) can be determined. In some examples, the temperature gradient associated with the inner thermopile 510, the temperature gradient associated with the outer thermopile 512, the lateral temperature difference 518, and at least one absolute temperature from $T_1$, $T_2$, $T_3$, or $T_4$ can be used to determine internal body temperature and/or ambient temperature. In some examples, rather than using the temperature gradients associated with the inner thermopile 510 and the outer thermopile 512, at least four absolute temperatures (e.g., $T_1$, $T_2$, $T_3$, and $T_4$) can be used to determine internal body temperature and/or ambient temperature. In some examples, as illustrated in FIG. 5, $T_1$ can represent a location of a first absolute temperature sensor, $T_2$ can represent a location a second absolute temperature sensor, $T_3$ can represent a location of a third absolute temperature sensor, and $T_4$ can represent a location of a fourth absolute temperature sensor can form a concentric ring structure. In some examples, the first absolute temperature sensor, the second absolute temperature sensor, the third absolute temperature sensor, and the fourth absolute temperature sensor can include vapor deposited, nickel-chromium resistance temperature detectors (NiCr RTDs). In some examples, the temperature gradient associated with the inner thermopile 510, the temperature gradient associated with the outer thermopile 512, and least two absolute temperatures (e.g., $T_1$ and $T_2$) can be used to determine internal body temperature and/or ambient temperature. In some examples, any suitable combination of the temperature gradient associated with the inner thermopile 510, the temperature gradient associated with the outer thermopile 512, the lateral temperature difference 518, and one or more absolute temperatures can be used to determine internal body temperature and/or ambient temperature.

Figure 6:
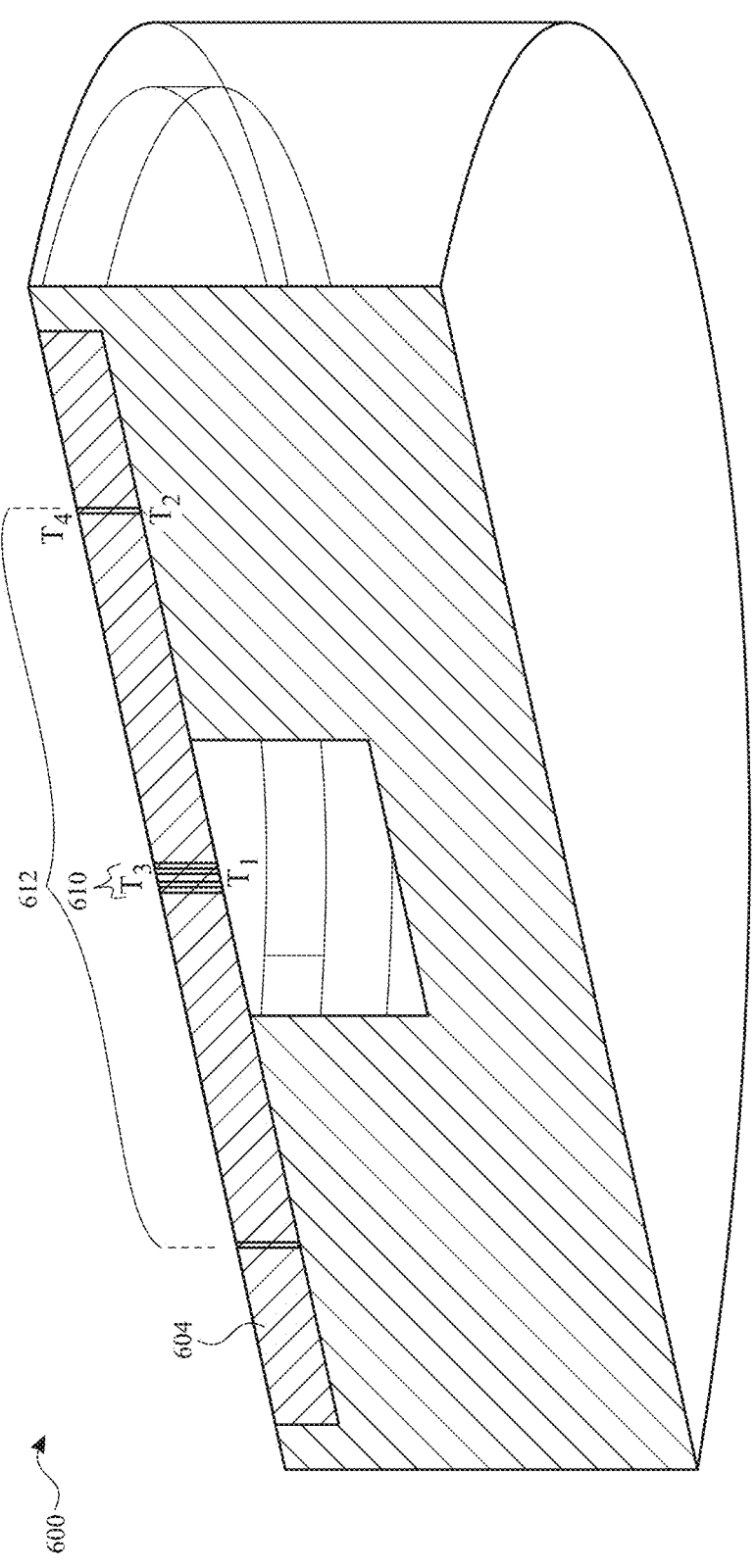
FIG. 6 illustrates a cross-sectional side view of an example temperature sensing system according to examples of the disclosure.

FIG. 6 illustrates a cross-sectional side view of an example temperature sensing system according to examples of the disclosure. The temperature sensing system 600 can include a layer of sensing glass 604 or a printed circuit board (PCB) embedded with inner thermopile 610 and outer thermopile 612. Temperature gradients associated with inner thermopile 610 and outer thermopile 612 can be used to determine thermal resistance of skin ($R_{wrist}$) and internal body temperature ($T_{inner}$). Additionally or alternatively, temperature gradients associated with inner thermopile 610 and outer thermopile 612 can be used to determine thermal resistance of air (h) and ambient temperature ($T_\infty$).

In some examples, to determine internal body temperature and/or ambient temperature, system equations [1] and/or [2] can be used.

$$Q_{conduction} = \frac{\delta T}{R_{path}} \qquad [1]$$

$$Q_{convection} = \delta T * h * A_{surface} \qquad [2]$$

In some examples, equation [1] can be used to determine the thermal resistance of skin and/or internal body temperature. To determine internal body temperature, equation [1] can be used to determine heat conduction associated with the inner thermopile 610, where $R_{path}$ can represent a first heat path from subsurface tissue of a user's body (e.g., resistance of fat tissue associated with the user's wrist) to the user's wrist (e.g., resistance of skin at the user's wrist). $\delta T$ can represent the change in temperature (e.g., temperature gradient) associated with the inner thermopile 610. Further, equation [1] can be used to determine heat conduction associated with the outer thermopile 612, where $R_{path}$ can represent a second heat path from the user's wrist (e.g., resistance of skin at a user's wrist) to a user's watch (e.g., resistance of the watch). $\delta T$ can represent the change in temperature (e.g., temperature gradient) of the outer thermopile 612.

In some examples, equation [1] and/or equation [2] can be used to determine thermal resistance of air (h) and/or ambient temperature. To determine ambient temperature, equation [1] can be used to determine heat conduction associated with the inner thermopile 610, where $R_{path}$ can represent a third heat path from the user's wrist (e.g., resistance of skin at the user's wrist) to the user's watch (e.g., resistance of the watch). Further, equation [1] can be used to determine heat conduction associated with the outer thermopile 612, where $R_{path}$ can represent a fourth heat path from the user's watch (e.g., resistance of the watch) to the ambient environment (e.g., resistance associated with wind speed and humidity). In some examples, only equation [1] using the third and fourth heat paths described above can be used to determine ambient temperature. In some examples, both equations [1] and [2] can be used to determine ambient temperature. In some examples, only equation [2] can be used to determine the ambient temperature. To determine the ambient temperature, equation [2] can be used to determine heat convection associated with the inner thermopile 610, where $A_{surface}$ can represent surface area of the inner thermopile 610 exposed to air. Further, equation [2] can be used to determine heat convection associated with the outer thermopile 612, where $A_{surface}$ can represent surface area of the outer thermopile 612 exposed to air.

In some examples, to determine thermal resistance of skin ($R_{wrist}$) and internal body temperature equations ($T_{inner}$) equations [3] and [4] can be used. Equations [3] and [4] represent equation [1] using the temperature gradient and thermal resistance for each path illustrated in FIGS. 5-6 (e.g., first heat path associated with the inner thermopile and second heat path associated with the outer thermopile.

$$Q_1 = \frac{T_3 - T_1}{R_{1-3}} = \left(\frac{T_{inner} - T_3}{R_{wrist}}\right) \qquad [3]$$

$$Q_2 = \frac{T_4 - T_2}{R_{2-4}} = \left(\frac{T_{inner} - T_4}{R_{wrist}}\right) \qquad [4]$$

Equation [3] represents heat flux (e.g., $Q_1$) associated with the inner thermopile 610. $T_3 - T_1$ represents a temperature gradient between a top surface of the inner thermopile 610 and a bottom surface of the inner thermopile 610. $R_{1-3}$ represents thermal resistance between the top surface of the inner thermopile 610 and the bottom surface of the inner thermopile 610. Equation [4] represents heat flux (e.g., $Q_2$) associated with the outer thermopile 612. $T_4 - T_2$ represents a temperature gradient between a top surface of the outer thermopile 612 and a bottom surface of the outer thermopile 612. $R_{2-4}$ represents thermal resistance between the top surface of the outer thermopile 612 and the bottom surface of the outer thermopile 612.

In some examples, internal body temperature ($T_{inner}$) can be determined using the following equation:

$$T_{inner} = \frac{E*(T_3 - T_1)*T_4 - (T_4 - T_2)*T_3}{E*(T_3 - T_1) - (T_4 - T_2)}, \text{ where } E = \frac{R_{2-4}}{R_{1-3}} \qquad [5]$$

In some examples, thermal resistance of skin ($R_{wrist}$) and internal body temperature ($T_{inner}$) can be determined based at least on the temperature gradient ($T_3 - T_1$) associated with the inner thermopile 610, the temperature gradient ($T_4 - T_2$) associated with the outer thermopile 612, a lateral temperature difference between the inner thermopile 610 and the outer thermopile 612, and an absolute temperature.

In some examples, to determine thermal resistance of air (h) and ambient temperature ($T_\infty$), system equations [6] and [7] can be used. Equations [6] and [7] represent equations [1] and [2] using the temperature gradient and thermal resistance for each path illustrated in FIGS. 5-6.

$$Q_1 = \frac{T_1 - T_3}{R_{1-3}} = (T_3 - T_\infty) * hA_3 \qquad [6]$$

$$Q_2 = \frac{T_2 - T_4}{R_{2-4}} = (T_4 - T_\infty) * hA_4 \qquad [7]$$

Equation [6] represents heat flux (e.g., $Q_1$) associated with the inner thermopile 610. The heat flux (e.g., $Q_1$) in equation 6 is equal to $$\frac{T_1 - T_3}{R_{1-3}},$$

which is representative of the third heat path associated with the inner thermopile 610 based on equation [1], and equal to $T_3-T_\infty$ based on equation [2]. $T_1-T_3$ represents a temperature gradient between a top surface of the inner thermopile 610 and a bottom surface of the inner thermopile 610. $R_{1-3}$ represents thermal resistance between the top surface of the inner thermopile 610 and the bottom surface of the inner thermopile 610. $A_3$ represents the surface area of a heat path associated with the inner thermopile 610 exposed to the ambient environment. Equation [7] represents heat flux (e.g., $Q_2$) associated with the outer thermopile 612. The heat flux (e.g., $Q_2$) in equation 7 is equal to $$\frac{T_2 - T_4}{R_{2-4}},$$

which is representative of the fourth heat path associated with the outer thermopile 612 based on equation [1], and equal to $T_4-T_\infty$ based on equation [2]. $T_2-T_4$ represents a temperature gradient between a top surface of the outer thermopile 612 and a bottom surface of the outer thermopile 612. $R_{2-4}$ represents thermal resistance between the top surface of the outer thermopile 612 and the bottom surface of the outer thermopile 612. $A_4$ represents the surface area of a heat path associated with the outer thermopile 610 exposed to the ambient environment.

In some examples, ambient temperature ($T_\infty$) can be determined using the following equation:

$$T_\infty = \frac{E*(T_1-T_3)*T_4 - (T_2-T_4)*T_3}{E*(T_1-T_3)-(T_2-T_4)}, \text{ where } E = \frac{(R_{2-4})*A_4}{(R_{1-3})*A_3} \qquad [8]$$

As mentioned above, thermal resistance of air (h) and ambient temperature ($T_\infty$) can be determined based at least on the temperature gradient ($T_1-T_3$) associated with the inner thermopile 610, the temperature gradient ($T_2-T_4$) associated with the outer thermopile 612, the lateral temperature difference between the inner thermopile 610 and the outer thermopile 612, and an absolute temperature.

Figures 7A, 7B:
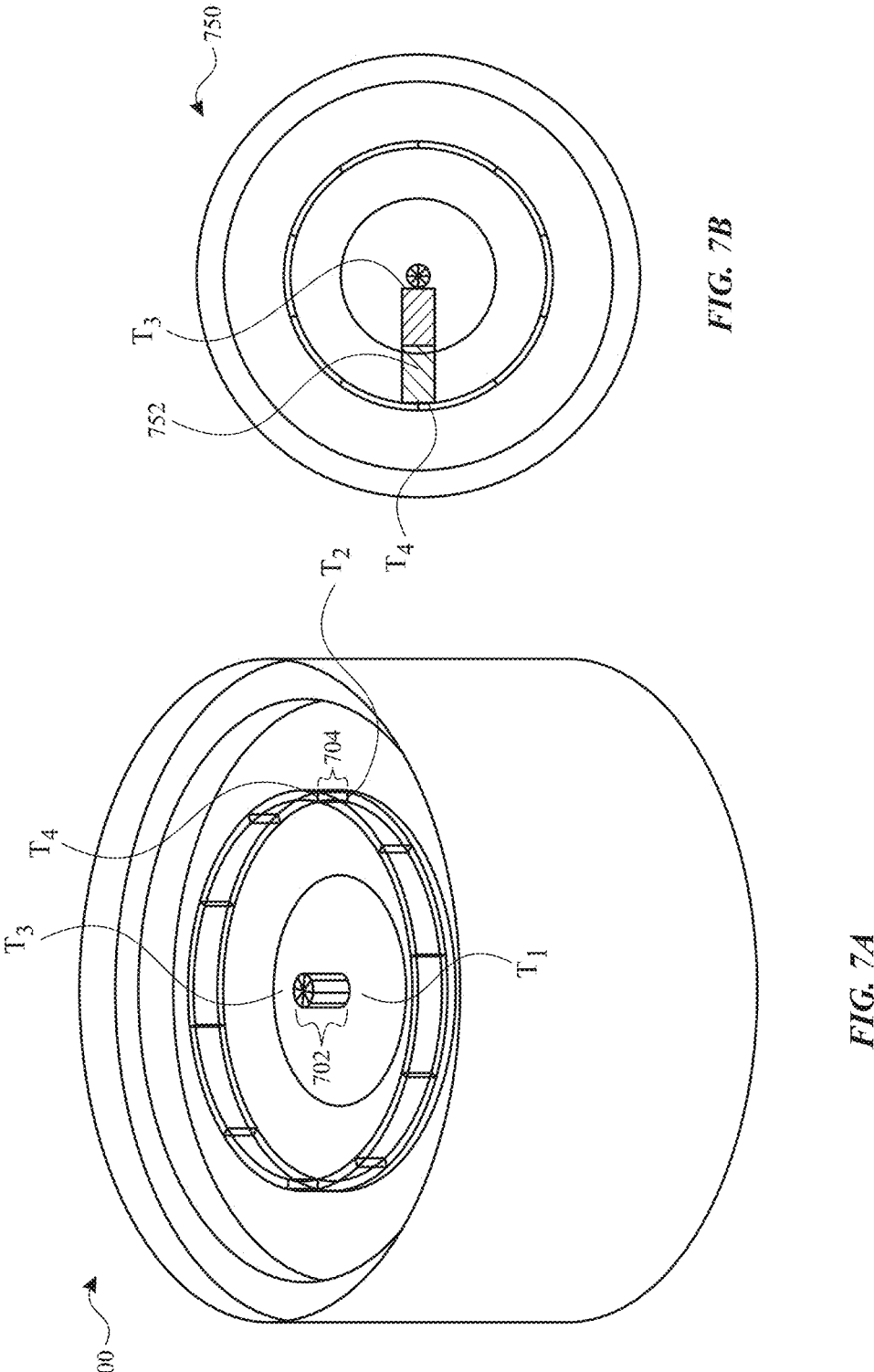
FIG. 7A illustrates an example temperature sensing system including example inner and outer thermopiles forming concentric geometries according to examples of the disclosure.
FIG. 7B illustrates a top view of an example temperature sensing system including an additional thermopile between the inner and outer thermopiles according to examples of the disclosure.

As discussed above and in some examples, inner and outer thermopiles are uniform in height and configured to form concentric geometries. Accordingly, FIG. 7A illustrates an example temperature sensing system 700 including inner thermopile 702 and outer thermopile 704 forming concentric shapes (e.g., concentric cylinders, concentric polygonal shapes, concentric geometric shapes, concentric non-geometric shapes) according to examples of the disclosure. By having little to no step up or height difference between the inner thermopile 702 and the outer thermopile 704, the temperature sensing system can be thinner, more compact, less expensive to manufacture, and easier to integrate into compact housings (e.g., watch, wearables, portables, etc.). In some examples, the inner thermopile 702 and the outer thermopile 704 can be separated by a layer of sensing glass or a layer of a printed circuit board (PCB). FIG. 7B illustrates a top view of an example temperature sensing system 750 that includes an additional thermopile 752 disposed between an inner thermopile (e.g., corresponding to inner thermopile 702) and an outer thermopile (e.g., corresponding to outer thermopile 704). As illustrated, the additional thermopile 752 can measure a lateral temperature gradient ($T_3-T_4$) between a top surface of the inner thermopile and a top surface of the outer thermopile. In some examples, the additional thermopile 752 can measure a lateral temperature gradient ($T_1-T_2$) between a bottom surface of the inner thermopile and a bottom surface of the outer thermopile.

Figure 8A:
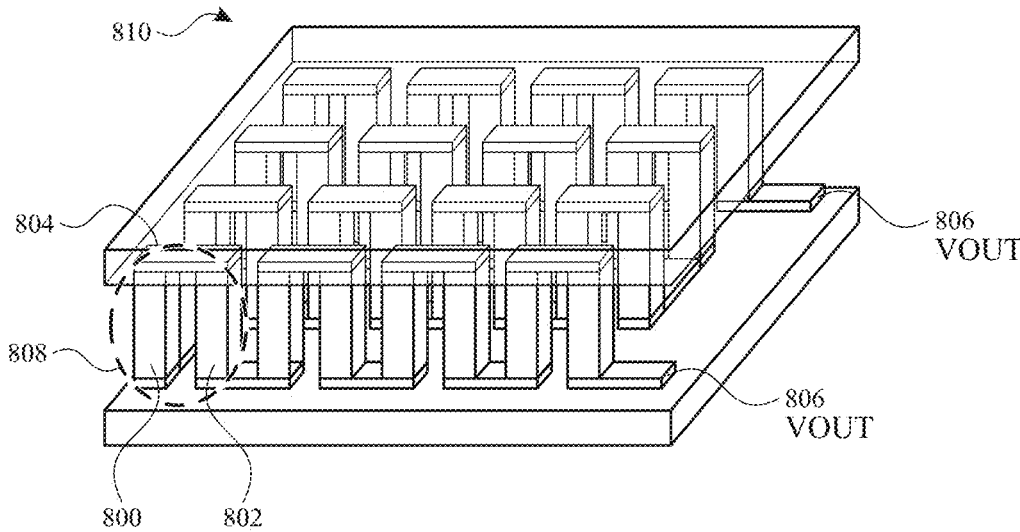
FIG. 8A illustrates a schematic illustration of an example thermopile according to examples of the disclosure.

In some examples, each thermopile can be formed from a series of thermocouples. In some examples, each thermocouple includes at least two dissimilar conductive materials (e.g., copper and constantan). As such, FIG. 8A illustrates a schematic illustration of an example thermopile 810 (e.g., inner thermopile, outer thermopile) formed from a series of thermocouples 808 according to examples of the disclosure. For example, an inner thermopile (e.g., corresponding to inner thermopile 702) can include a first set of dissimilar conductive materials (e.g., metal fillings) different from a second set of dissimilar conductive materials of the outer thermopile (e.g., corresponding to outer thermopile 704). In some examples, the inner thermopile can include a first set of dissimilar conductive materials (e.g., metal fillings) that are similar to second set of dissimilar conductive materials of the outer thermopile. In some examples, each of the first and second set of dissimilar conductive materials can include any number of dissimilar metals or alloys (e.g., 2, 3, 4, or 5 different metals). Non-limiting examples of the first set of dissimilar conductive materials includes copper and constantan; chromel and constantan; chromium and constantan; nickel, copper, and chromium; and copper and chromium. Non-limiting examples of the second set of dissimilar conductive materials includes copper and constantan; chromel and constantan; chromium and constantan; nickel, copper, and chromium; and copper and chromium.

To manufacture the embedded inner thermopile and the outer thermopile within sensing glass, via holes can be formed through a layer of the sensing glass, and filled with respective vias (e.g., respective conductive materials). In some examples, the inner thermopile and the outer thermopile can be embedded within a printed circuit board (PCB). As such, various printed circuit board (PCB) processing methods, using with various materials (e.g., high volume production processes) can be used to create the vias. Deposition methods for forming the different layers include printing, dispensing material into holes/vias, and vacuum printing.

For example, a first via 800 can be filled with copper, copper particles suspended in epoxy, or copper-coated particles suspended in epoxy (e.g., according to a "via fill" manufacturing process). Additionally or alternatively, the first via 800 can be filled with aluminum, gold, carbon ink, or any suitable metal or alloy. Similarly, a second via 802 can be filled with such as constantan, constantan particles suspended in epoxy, or constantan-coated particles suspended in epoxy. Additionally or alternatively, the second via 802 can be filled with aluminum, gold, carbon ink, or any suitable metal or alloy. In some examples, if the inner thermopile and the outer thermopile 704 are embedded within the printed circuit board (PCB), then the two vias can be then connected via a conductive trace 804. In some examples, the conductive trace 804 can include copper, aluminum, gold, carbon ink, or any suitable metal or alloy. In some examples, if the inner thermopile and the outer thermopile are embedded within the printed circuit board (PCB), the two vias 800 and 802 can be then connected using patterning at a copper layer of the printed circuit board (PCB), such as a copper connector 804. Connecting the first and second vias 800 and 802 using the conducive trace or the copper connecter 804 forms a thermocouple, when the metal filled in the first via 800 has a different Seebeck coefficient than the metal filled in the second via 802. Since the first and second vias 800 and 802 can span the height of the sensing glass or the printed circuit board (PCB), a thermopile 810 formed from the series combination of such vias measures heat flux, or the temperature differential/gradient, across the height of the sensing glass or the printed circuit board (PCB). Each pair of connected vias, such as the first and second vias 800 and 802, with dissimilar conductors (e.g., metals) forms a thermocouple 808, and connecting such pairs of connected vias forms a thermopile 810 embedded within the sensing glass or the printed circuit board (PCB). In some examples, each thermocouple 808 can be two-dimensional, and a series of thermocouples 808 can form a multidimensional (e.g., three-dimensional) thermopile 810. The thermopile 810 can output a voltage measurement 806 that is directly proportional to a temperature gradient and/or heat flux, which can help determine internal body temperature and/or ambient temperature.

Figure 8B:
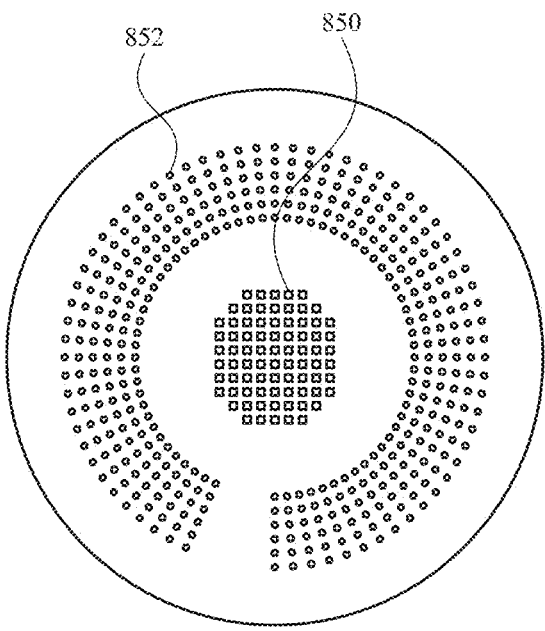
FIG. 8B illustrates a top view of example inner and outer thermopiles according to examples of the disclosure.

FIG. 8B illustrates a top view of example inner thermopile 850 and outer thermopile 852 according to examples of the disclosure. In some examples, the inner thermopile 850 can include a cluster of thermocouples (e.g., forming a "solid" cylindrical shape, a rectangular shape, a geometric shape, or a non-geometric shape). In some examples, the cluster of thermocouples of the inner thermopile 850 can be concentric or non-concentric. In some examples, the inner thermopile 850 can include any number of thermocouple rows and any number of thermocouple columns. In some examples, the outer thermopile 852 can include a cluster of thermocouples (e.g., forming a "hollow" cylindrical shape, a rectangular shape, a geometric shape, or a non-geometric shape) can include any number of thermocouple rows, such as 6 rows of thermocouples as illustrated in FIG. 8B, and any number of thermocouple columns. In some examples, the cluster of thermocouples of the outer thermopile 852 can be concentric in relation to the cluster of thermocouples of the inner thermopiles. In some examples, the cluster of thermocouples of the outer thermopile 852 can be non-concentric.

In some examples, the temperature sensing system (e.g., dual heat flux sensor) described in FIGS. 2-7 is disposed in the wearable device (e.g., watch) such that the temperature sensing system measures a vertical gradient (e.g., parallel to a line from the front face to the rear face). Alternatively, in some examples, the temperature sensing system is disposed in the wearable device such that the temperature sensing system measures a lateral gradient (e.g., perpendicular to a line from the front face to the rear face). In some examples, more than one temperature sensing systems can be integrated into a wearable device, such as a first temperature sensing system that measures a vertical gradient and a second temperature sensing system that measures a lateral gradient. The use of one or more temperature sensing systems measuring one or more lateral gradients can allows the wearable device to account for variances in thermal resistance of skin (e.g., skin 902 in FIGS. 9A-9B) and/or air (e.g., variances in thermal resistance due to variance in amount of fat tissue, wind speed, humidity) when determining ambient temperature and/or internal body temperature. In some examples, a wearable device that includes at least two temperature sensing systems improves accuracy of temperature and/or internal body temperature measurements. In some examples, a wearable device that includes a first temperature sensing system disposed at or near (within a threshold distance of) a center of the wearable device (optionally near a front face or rear face) and a second temperature sensing system disposed at or near (within a threshold distance of) a side of the wearable device to measure a lateral gradient can improve accuracy of temperature and/or internal body temperature measurements.

Figure 9A:
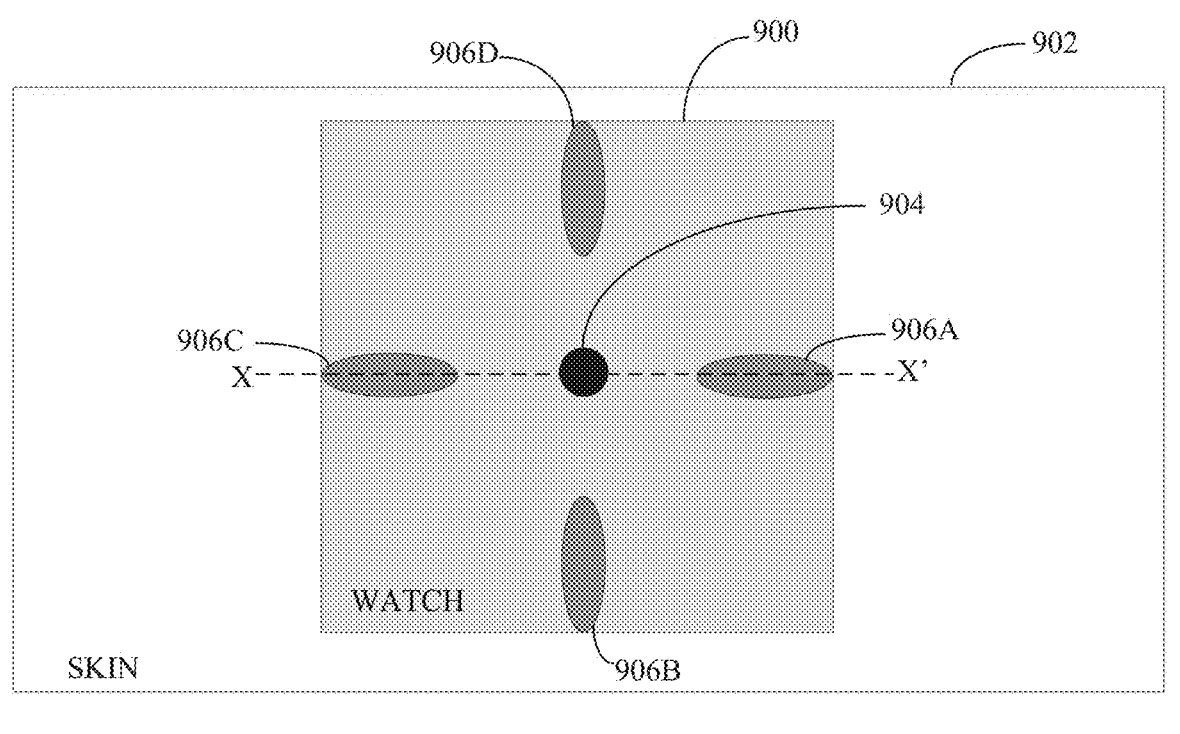
FIGS. 9A-9B illustrate a top view and a cross-sectional side view of an example wearable device that includes one or more temperature sensing systems according to examples of the disclosure.

FIG. 9A illustrates a top view of wearable device (e.g., watch) 900 that includes a first temperature sensing system 904 disposed at or near a front face of the wearable device 900 (e.g., approximately at the center of the front face) and one or more second temperature sensing systems 906A, 906B, 906C, or 906D disposed at or near a side surface of the wearable device 900. In some examples, the first temperature sensing system includes a dual heat flux sensor to measure a vertical gradient of the wearable device 900 (e.g., corresponding to temperature sensing system 500). In some examples, the second temperature sensing system includes a dual heat flux sensor to measure a lateral gradient at a lateral surface of the wearable device 900 (e.g., corresponding to temperature sensing system 500 but oriented laterally in the wearable device 900). In some examples, the second temperature sensing system includes a thermopile and an absolute temperature sensor to measure a lateral gradient at a lateral surface of the wearable device 900. In some examples, the second temperature sensing system includes two absolute temperature sensors to measure a lateral gradient at a lateral surface of the wearable device 900. As indicated by the dashed line labeled X-X', structures of the wearable device 900 including one or more temperature sensing systems are further described with respect to the cross-section of the wearable device 900 as shown in FIG. 9B.

In some examples, a single temperature sensing system (e.g., first temperature sensing system 904 in FIG. 9A) is disposed at a face of the wearable device 900 and a single temperature sensing (e.g., a second temperature sensing system 906A, 906B, 906C, or 906D in FIG. 9A) is disposed at any side surface of the wearable device. As shown in FIG. 9A, the first temperature sensing system 904 is disposed at a central position on the front face of the wearable device 900 (e.g., at or near the center of a plane parallel to a watch face), and the second temperature sensing system 906A, 906B, 906C, or 906D is disposed at a central position on a respective side surface of the wearable device 900 (e.g., at or near a center of a side of a plane parallel to a watch face). It is understood that the placement of temperature sensing systems in FIG. 9A is a non-limiting example. In some examples, the first temperature sensing system 904 is disposed at any suitable position (e.g., off-center of the plane of the face), and the second temperature sensing system 906A, 906B, 906C, or 906D is disposed at any suitable position (e.g., off-center of a side of the plane of the face).

In some examples, multiple temperature sensing systems measuring lateral gradients are disposed at multiple sides of the wearable device 900. For example, temperature sensing system 906A is optionally disposed at or near a first side of the wearable device 900, temperature sensing system 906B is optionally disposed at or near a second side of the wearable device 900, temperature sensing system 906C is optionally disposed at or near a third side of the wearable device 900, and temperature sensing system 906D is optionally disposed at or near a fourth side of the wearable device 900. Each of the four temperature sensing systems 906A-906D can measure a lateral temperature gradient for a respective side of the wearable device. In some examples, in addition to the first temperature sensing system measuring a vertical gradient, at least one additional temperature sensing system measuring a lateral gradient is disposed at a respective side of the wearable device 900.

Figure 9B:
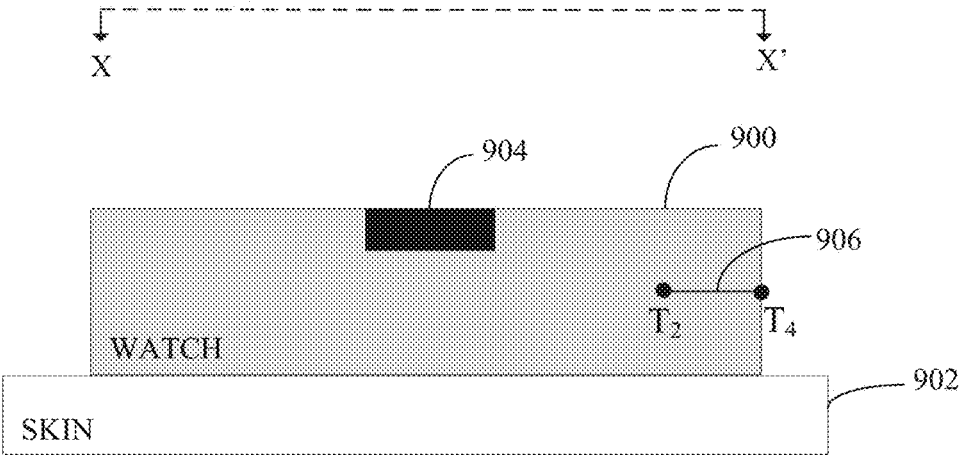

FIG. 9B illustrates a cross-sectional side view of wearable device (e.g., watch) 900 that includes a first temperature sensing system 904 disposed on a front face of the wearable device 900 and a second temperature sensing system 906 (e.g., corresponding to temperature sensing system 906A in FIG. 9A) disposed at a representative side of the wearable device 900. As shown in FIG. 9B, the second temperature sensing system 956 measures a lateral gradient corresponding to a difference between $T_2$ and $T_4$. The second temperature sensing system 906 corresponds to the second temperature sensing system 906A of FIG. 9A. In some examples, the wearable device 900 includes additional temperature sensing system(s) configured to measure additional lateral gradient(s). For example, the additional temperature sensing system(s) can correspond to the second temperature sensing system 906C of FIG. 9A the details of which are not shown or repeated for brevity.

FIG. 10 illustrates an example process 1000 for measuring internal temperature and/or ambient temperature according to some examples of the disclosure. The measuring of internal temperature and/or ambient temperature can include computing operations based on measured temperatures from one or more absolute temperature sensors and from one or more thermopiles. At block 1002, processing circuitry of an electronic device (e.g., electronic device 200, wearable device 150) can receive a thermal gradient associated with an inner thermopile and a thermal gradient associated with the outer thermopile. Temperature gradient measurements of thermopiles (e.g., inner thermopile, outer thermopile) can be used for determining heat flux.

At block 1004, the processing circuitry can compute a thermal resistance of skin and internal body temperature based at least on the thermal gradient associated with the inner thermopile, the thermal gradient associated with the outer thermopile, a lateral temperature difference between the inner thermopile and the outer thermopile, and at least one absolute temperature (e.g., $T_1$, $T_2$, $T_3$, or $T_4$). Further, the processing circuitry can compute a thermal resistance of air and ambient temperature based at least on the thermal gradient associated with the inner thermopile, the thermal gradient associated with the outer thermopile, a lateral temperature difference between the inner thermopile and the outer thermopile, and at least one absolute temperature (e.g., $T_1$, $T_2$, $T_3$, or $T_4$). In some examples, the processing circuitry can compute the lateral temperature difference between the inner thermopile and the outer thermopile using an additional thermopile between the inner thermopile and the outer thermopile and/or at least one absolute temperature sensor. At block 1006, the processing circuitry can display the internal body temperature and/or ambient temperature via a display (e.g., corresponding to touch screen 152) of the wearable device. It is understood that process 1000 illustrated in FIG. 10 is not limited to the operation as presented, but can include, fewer, additional, and/or simultaneous operations according to various examples.

Therefore, according to the above, some examples of the disclosure are directed to an electronic device. The electronic device can comprise a thermal sensing system. The thermal sensing system can comprise a sensing surface, where the sensing surface comprises an inner thermopile associated with a first heat path and an outer thermopile associated with a second heat path, where the inner thermopile is same in height as the outer thermopile, and where the inner thermopile and the outer thermopile form concentric geometries. The thermal sensing system can comprise a first absolute temperature configured to measure a first absolute temperature. The electronic device can comprise a processor communicatively coupled to the thermal sensing system and configured to compute an ambient temperature or body temperature using a first temperature gradient associated with the first heat path, a second temperature gradient associated with the second heat path, a lateral temperature difference between the inner thermopile and the outer thermopile, and the first absolute temperature. Additionally or alternatively to one or more of the examples disclosed above, in some examples, the processor can be configured to compute the ambient temperature or the body temperature using the first temperature gradient associated with the first heat path, the second temperature gradient associated with the second heat path, and at least two absolute temperatures. Additionally or alternatively to one or more of the examples disclosed above, in some examples, the first absolute temperate sensor can be configured to measure a first absolute temperature at a first surface of the inner thermopile. The thermal sensing system can comprise a second absolute temperate sensor configured to measure a second absolute temperature at a first surface of the outer thermopile. Additionally or alternatively to one or more of the examples disclosed above, in some examples, the processor can be configured to compute the ambient temperature or the body temperature using the first temperature gradient associated with the first heat path, a second temperature gradient associated with the second heat path, and at least two absolute temperatures. Additionally or alternatively to one or more of the examples disclosed above, in some examples, the processor can be configured to compute the lateral temperature difference between the inner thermopile and the outer thermopile using the first absolute temperature and the second absolute temperature. Additionally or alternatively to one or more of the examples disclosed above, in some examples, processor can be configured to compute the lateral temperature difference between the inner thermopile and the outer thermopile using a surface thermopile disposed between the inner thermopile and the outer thermopile. Additionally or alternatively to one or more of the examples disclosed above, in some examples, the processor can be configured to compute the ambient temperature using the first temperature gradient, the second temperature gradient, the lateral temperature difference between the inner thermopile and the outer thermopile, a first surface area of the first heat path exposed to the ambient temperature, a second surface area of the second heat path exposed to the ambient temperature, a first resistance associated with the first heat path, and a second resistance associated with the second heat path. Additionally or alternatively to one or more of the examples disclosed above, in some examples, the sensing surface can comprise glass or a printed circuit board. Additionally or alternatively to one or more of the examples disclosed above, in some examples, the inner thermopile can comprise a first set of metal fillings and the outer thermopile can comprise a second set of metal fillings different from the first set of metal fillings. Additionally or alternatively to one or more of the examples disclosed above, in some examples, the first set of metal fillings can comprise copper and constantan and the second set of metal fillings can comprise chromel and constantan. Additionally or alternatively to one or more of the examples disclosed above, in some examples, the thermal sensing system can comprise a passivation layer disposed on the sensing surface, and the passivation layer can comprise epoxy, silicon nitride, glass, a polymer material, a ceramic material, a composite material, or any combination thereof. Additionally or alternatively to one or more of the examples disclosed above, in some examples, the thermal sensing system can comprise a thermal insulation layer disposed a threshold distance from the outer thermopile. Additionally or alternatively to one or more of the examples disclosed above, in some examples, the concentric geometries can comprise concentric cylinders. Some examples of the disclosure are directed to a method of operating the system described herein or a non-transitory computer readable storage medium storing instructions configured to be executed by one or more processors of the system to cause the processor(s) to perform any of the above operations of the system.

Some examples of the disclosure are directed to a dual heat flux sensor. The dual heat flux sensor can comprise a sensing glass comprising an inner thermopile and an outer thermopile, where the inner thermopile and the outer thermopile are uniform in height and form concentric geometries. The dual heat flux sensor can comprise a plurality of vias in the sensing glass comprising a plurality of first vias from a first surface of the sensing glass to a second surface of the sensing glass and a plurality of second vias from the first surface of the sensing glass to the second surface of the sensing glass, where the inner thermopile is formed from a first set of conductive materials filling the plurality of first vias and the outer thermopile is formed from a second set of conductive materials filling the plurality of second vias. The dual heat flux sensor can comprise sensing circuitry configured to measure a temperature gradient associated with the inner thermopile and a second temperature gradient associated with the outer thermopile. Additionally or alternatively to one or more of the examples disclosed above, in some examples, the first set of conductive materials can be different than the second set of conductive materials. Additionally or alternatively to one or more of the examples disclosed above, in some examples, a diameter of the dual heat flux sensor can be at least 1.5 times greater than a diameter of the outer thermopile. Additionally or alternatively to one or more of the examples disclosed above, in some examples, a diameter of the dual heat flux sensor can be between 9 millimeters and 12 millimeters. Additionally or alternatively to one or more of the examples disclosed above, in some examples, a height of the dual heat flux sensor can be less than 4 millimeters. Additionally or alternatively to one or more of the examples disclosed above, in some examples, the dual heat flux sensor can comprise a housing coupled to the sensing glass, the housing can comprise a cavity disposed beneath the sensing glass, and the cavity can comprise air. Additionally or alternatively to one or more of the examples disclosed above, in some examples, the cavity can comprise a height between 0.5 millimeters and 2.5 millimeters. Additionally or alternatively to one or more of the examples disclosed above, in some examples, the dual heat flux sensor can comprise a glass layer different from the sensing glass and disposed beneath the sensing glass. Some examples of the disclosure are directed to a method of operating the system described herein or a non-transitory computer readable storage medium storing instructions configured to be executed by one or more processors of the system to cause the processor(s) to perform any of the above operations of the system.

Some examples of the disclosure are directed to a method. The method can include measuring one or more absolute temperatures; measuring a first thermal gradient associated with a first thermopile and a second thermal gradient associated with a second thermopile from a dual heat flux sensor; and computing an ambient temperature or an internal body temperature using the first thermal gradient, the second thermal gradient, a lateral temperature difference between the first thermopile and the second thermopile, the one or more absolute temperatures, or any combination thereof. Additionally or alternatively to one or more of the examples disclosed above, in some examples, the method can include computing the lateral temperature difference between the first thermopile and the second thermopile using a third thermopile disposed between the first thermopile and the second thermopile or the one or more absolute temperature sensors. Additionally or alternatively to one or more of the examples disclosed above, in some examples, the method can include outputting (e.g., displaying) an internal body temperature or ambient temperature. Some examples of the disclosure are directed to a non-transitory computer readable storage medium storing instructions configured to be executed by one or more processors of the system to cause the processor(s) to perform any of the above operations of the system.

Some examples of the disclosure are directed to a non-transitory computer readable storage medium. The non-transitory computer readable storage medium storing instructions configured to be executed by one or more processors of the system to cause the processor(s) to: measure one or more absolute temperatures; measure a first thermal gradient associated with a first thermopile and a second thermal gradient associated with a second thermopile from a dual heat flux sensor; and compute an ambient temperature or an internal body temperature using the first thermal gradient, the second thermal gradient, a lateral temperature difference between the first thermopile and the second thermopile, the one or more absolute temperatures, or any combination thereof. Additionally or alternatively to one or more of the examples disclosed above, in some examples, the instructions, when executed by one or more processors of the system, cause the processor(s) to: compute the lateral temperature difference between the first thermopile and the second thermopile using a third thermopile disposed between the first thermopile and the second thermopile or the one or more absolute temperature sensors. Additionally or alternatively to one or more of the examples disclosed above, in some examples, the instructions, when executed by one or more processors of the system, cause the processor(s) to: output (e.g., displaying) an internal body temperature or ambient temperature. Some examples of the disclosure are directed to a method of operating the system described herein.

Some examples of the disclosure are directed to a system. The system can comprise a first absolute temperature sensor configured to measure a first absolute temperature at a first surface of an inner thermopile, a second absolute temperature sensor configured to measure a second absolute temperature at a first surface of an outer thermopile, a third absolute temperature sensor configured to measure a third absolute temperature at a second surface of the inner thermopile, and a fourth absolute temperature sensor configured to measure a fourth absolute temperature at a second surface of the outer thermopile. Further, the system can comprise a processor communicatively coupled to the first absolute temperature sensor, the second absolute temperature sensor, the third absolute temperature sensor, and the fourth absolute temperature sensor and configured to compute an ambient temperature or an internal body temperature using the first absolute temperature, the second absolute temperature, the third absolute temperature, and the fourth absolute temperature. Some examples of the disclosure are directed to a method of operating the system described herein or a non-transitory computer readable storage medium storing instructions configured to be executed by one or more processors of the system to cause the processor(s) to perform any of the above operations of the system.

Some examples of the disclosure are directed to a system. The system can comprise a first temperature sensing system configured to measure one or more vertical gradients and a second temperature sensing system configured to measure one or more lateral gradients. Additionally or alternatively to one or more of the examples disclosed above, in some examples, the first temperature sensing system includes a first dual heat flux sensor and/or a second dual heat flux sensor. The first dual heat flux sensor and/or the second dual heat flux sensor can correspond to any of the above described heat flux sensors. For example, a respective dual heat flux sensor can comprise a sensing glass, a plurality of vias in the sensing glass, and sensing circuitry. The sensing glass can comprise an inner thermopile and an outer thermopile, where the inner thermopile and the outer thermopile are uniform in height and form concentric geometries. The plurality of vias in the sensing glass can comprise a plurality of first vias from a first surface of the sensing glass to a second surface of the sensing glass and a plurality of second vias from the first surface of the sensing glass to the second surface of the sensing glass, where the inner thermopile is formed from a first set of conductive materials filling the plurality of first vias and the outer thermopile is formed from a second set of conductive materials filling the plurality of second vias. Sensing circuitry can be configured to measure a temperature gradient associated with the inner thermopile and a second temperature gradient associated with the outer thermopile.

Some examples of the disclosure are directed to a wearable device. The wearable device can comprise a temperature sensing system configured to measure one or more vertical gradients and one or more temperature sensing systems configured to measure one or more lateral gradients. Additionally or alternatively to one or more of the examples disclosed above, in some examples, one or more temperature sensing systems configured to measure one or more lateral gradients can include a first temperature sensing system configured to measure a first lateral gradient corresponding to a first side of the wearable device, a second temperature sensing system configured to measure a second lateral gradient corresponding to a second side of the wearable device, a third temperature sensing system configured to measure a third lateral gradient corresponding to a third side of the wearable device, and a fourth temperature sensing system configured to measure a fourth lateral gradient corresponding to a fourth side of the wearable device. Additionally or alternatively to one or more of the examples disclosed above, in some examples, the temperature sensing system configured to measure the vertical gradient and/or the one or more temperature sensing systems configured to measure the one or more lateral gradients can comprise a dual heat flux sensor corresponding to any of the above described heat flux sensors. For example, a respective dual heat flux sensor can comprise a sensing glass, a plurality of vias in the sensing glass, and sensing circuitry. The sensing glass can comprise an inner thermopile and an outer thermopile, where the inner thermopile and the outer thermopile are uniform in height and form concentric geometries. The plurality of vias in the sensing glass can comprise a plurality of first vias from a first surface of the sensing glass to a second surface of the sensing glass and a plurality of second vias from the first surface of the sensing glass to the second surface of the sensing glass, where the inner thermopile is formed from a first set of conductive materials filling the plurality of first vias and the outer thermopile is formed from a second set of conductive materials filling the plurality of second vias. Sensing circuitry can be configured to measure a temperature gradient associated with the inner thermopile and a second temperature gradient associated with the outer thermopile.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device, comprising:
a thermal sensing system comprising:
 a sensing surface, wherein the sensing surface comprises an inner thermopile associated with a first heat path and an outer thermopile associated with a second heat path, wherein the inner thermopile is same in height as the outer thermopile, and wherein the inner thermopile and the outer thermopile form concentric geometries; and
 a first absolute temperature sensor configured to measure a first absolute temperature; and
a processor communicatively coupled to the thermal sensing system and configured to compute an ambient temperature or body temperature using a first temperature gradient associated with the first heat path, a second temperature gradient associated with the second heat path, a lateral temperature difference between the inner thermopile and the outer thermopile, and the first absolute temperature.

2. The electronic device of claim 1, wherein the processor is configured to compute the ambient temperature or the body temperature using the first temperature gradient associated with the first heat path, the second temperature gradient associated with the second heat path, and at least two absolute temperatures.

3. The electronic device of claim 1, wherein the first absolute temperature sensor is configured to measure the first absolute temperature at a first surface of the inner thermopile, wherein the thermal sensing system comprises a second absolute temperature sensor configured to measure a second absolute temperature at a first surface of the outer thermopile.

4. The electronic device of claim 3, wherein the processor is configured to compute the lateral temperature difference between the inner thermopile and the outer thermopile using the first absolute temperature and the second absolute temperature.

5. The electronic device of claim 1, wherein the processor is configured to compute the lateral temperature difference between the inner thermopile and the outer thermopile using a surface thermopile disposed between the inner thermopile and the outer thermopile.

6. The electronic device of claim 1, wherein the processor is configured to compute the ambient temperature using the first temperature gradient, the second temperature gradient, the lateral temperature difference between the inner thermopile and the outer thermopile, a first surface area of the first heat path exposed to the ambient temperature, a second surface area of the second heat path exposed to the ambient temperature, a first resistance associated with the first heat path, and a second resistance associated with the second heat path.

7. The electronic device of claim 1, wherein the sensing surface comprises glass or a printed circuit board.

8. The electronic device of claim 1, wherein the inner thermopile comprises a first set of metal fillings and the outer thermopile comprises a second set of metal fillings different from the first set of metal fillings.

9. The electronic device of claim 8, wherein the first set of metal fillings comprises copper and constantan and the second set of metal fillings comprises chromel and constantan.

10. The electronic device of claim 1, wherein the thermal sensing system comprises a passivation layer disposed on the sensing surface, wherein the passivation layer comprises epoxy, silicon nitride, glass, a polymer material, a ceramic material, a composite material, or any combination thereof.

11. The electronic device of claim 1, wherein the thermal sensing system comprises a thermal insulation layer disposed a threshold distance from the outer thermopile.

12. The electronic device of claim 1, wherein the concentric geometries comprise concentric cylinders.

13. A dual heat flux sensor, comprising:
a sensing glass comprising an inner thermopile and an outer thermopile, wherein the inner thermopile and the outer thermopile are uniform in height and form concentric geometries;
a plurality of vias in the sensing glass comprising a plurality of first vias from a first surface of the sensing glass to a second surface of the sensing glass and a plurality of second vias from the first surface of the sensing glass to the second surface of the sensing glass, wherein the inner thermopile is formed from a first set of conductive materials filling the plurality of first vias and the outer thermopile is formed from a second set of conductive materials filling the plurality of second vias; and sensing circuitry configured to measure a temperature gradient associated with the inner thermopile and a second temperature gradient associated with the outer thermopile.

14. The dual heat flux sensor of claim 13, wherein a diameter of the dual heat flux sensor is at least 1.5 times greater than a diameter of the outer thermopile.

15. The dual heat flux sensor of claim 13, wherein a diameter of the dual heat flux sensor is between 9 millimeters and 12 millimeters.

16. The dual heat flux sensor of claim 13, wherein a height of the dual heat flux sensor is less than 4 millimeters.

17. The dual heat flux sensor of claim 13, wherein the dual heat flux sensor comprises a housing coupled to the sensing glass, wherein the housing comprises a cavity disposed beneath the sensing glass, and wherein the cavity comprises air.

18. The dual heat flux sensor of claim 17, wherein the cavity comprises a height between 0.5 millimeters and 2.5 millimeters.

19. The dual heat flux sensor of claim 13, comprising a glass layer different from the sensing glass and disposed beneath the sensing glass.

20. A system, comprising:
a first absolute temperature sensor configured to measure a first absolute temperature at a first surface of an inner thermopile;
a second absolute temperature sensor configured to measure a second absolute temperature at a first surface of an outer thermopile, wherein the inner thermopile is same in height as the outer thermopile, and wherein the inner thermopile and the outer thermopile form concentric geometries;
a third absolute temperature sensor configured to measure a third absolute temperature at a second surface of the inner thermopile;
a fourth absolute temperature sensor configured to measure a fourth absolute temperature at a second surface of the outer thermopile; and
a processor communicatively coupled to the first absolute temperature sensor, the second absolute temperature sensor, the third absolute temperature sensor, and the fourth absolute temperature sensor and configured to compute an ambient temperature or an internal body temperature using the first absolute temperature, the second absolute temperature, the third absolute temperature, and the fourth absolute temperature.

* * * * *